United States Patent [19]

Brown

[11] Patent Number: 5,653,795
[45] Date of Patent: Aug. 5, 1997

[54] BULKING AND OPACIFYING FILLERS FOR CELLULOSIC PRODUCTS

[75] Inventor: Alan J. Brown, Vancouver, Wash.

[73] Assignee: Columbia River Carbonates, Woodland, Wash.

[21] Appl. No.: 558,683

[22] Filed: Nov. 16, 1995

[51] Int. Cl.⁶ ............................................. C09C 1/02
[52] U.S. Cl. .................. 106/469; 106/416; 106/419;
106/437; 106/445; 106/447; 106/448; 106/460;
106/464; 106/465; 106/471; 106/491; 106/499;
162/135; 162/158; 162/162; 162/181.1;
162/181.4; 162/183
[58] Field of Search ........................... 106/416, 419,
106/437, 445, 447, 448, 460, 464, 465,
469, 471, 491, 499; 162/135, 158, 162,
181.1, 181.4, 183

[56] References Cited

U.S. PATENT DOCUMENTS

| | | | |
|---|---|---|---|
| 2,176,876 | 10/1939 | Alessandroni | 106/423 |
| 3,014,836 | 12/1961 | Proctor, Jr. | 162/181.8 |
| 3,663,461 | 5/1972 | Witt | 528/405 |
| 3,804,656 | 4/1974 | Kaliski et al. | 106/487 |
| 4,026,762 | 5/1977 | Bauman | 162/181.2 |
| 4,028,173 | 6/1977 | Olson | 162/181.2 |
| 4,076,548 | 2/1978 | Bundy et al. | 106/416 |
| 4,078,941 | 3/1978 | Bundy et al. | 106/409 |
| 4,115,187 | 9/1978 | Davidson | 162/168 R |
| 4,167,420 | 9/1979 | Linden et al. | 106/447 |
| 4,167,421 | 9/1979 | Linden et al. | 106/447 |
| 4,174,279 | 11/1979 | Clark et al. | 210/736 |
| 4,381,948 | 5/1983 | McConnell et al. | 106/416 |
| 4,610,801 | 9/1986 | Matthews et al. | 252/181 |
| 4,714,603 | 12/1987 | Vanderheiden | 423/432 |
| 4,732,748 | 3/1988 | Stewart et al. | 423/470 |
| 4,738,726 | 4/1988 | Pratt et al. | 106/487 |
| 4,824,654 | 4/1989 | Ota et al. | 423/432 |
| 4,888,160 | 12/1989 | Kosin et al. | 423/430 |
| 4,892,590 | 1/1990 | Gill et al. | 106/464 |
| 4,900,533 | 2/1990 | Malden | 423/430 |
| 4,943,324 | 7/1990 | Bundy et al. | 106/486 |
| 5,006,574 | 4/1991 | Sennett et al. | 523/351 |
| 5,068,276 | 11/1991 | Suitch et al. | 524/413 |
| 5,076,846 | 12/1991 | Buri et al. | 106/401 |
| 5,082,887 | 1/1992 | Brown et al. | 524/413 |
| 5,112,782 | 5/1992 | Brown et al. | 501/144 |
| 5,169,441 | 12/1992 | Lauzon | 106/416 |
| 5,203,918 | 4/1993 | Rice | 106/486 |
| 5,207,822 | 5/1993 | Manasso et al. | 106/416 |
| 5,236,989 | 8/1993 | Brown et al. | 524/413 |
| 5,261,956 | 11/1993 | Dunaway et al. | 106/416 |
| 5,279,663 | 1/1994 | Kaliski | 106/486 |
| 5,298,066 | 3/1994 | Shurling, Jr. et al. | 106/487 |
| 5,317,053 | 5/1994 | Brown et al. | 524/425 |
| 5,320,672 | 6/1994 | Whalen-Shaw | 106/287.24 |
| 5,336,311 | 8/1994 | Curtis et al. | 106/416 |
| 5,384,013 | 1/1995 | Husband et al. | 106/416 |

FOREIGN PATENT DOCUMENTS

| | | |
|---|---|---|
| 2016498 | 9/1979 | United Kingdom . |
| 2125838 | 3/1984 | United Kingdom . |
| WO91/08341 | 6/1991 | WIPO . |

OTHER PUBLICATIONS

Passaretti, et al., "Application of High–Opacity Precipitated Calcium Carbonate," *Tappi Journal* 76:135–140 (1993) (No Month).

Primary Examiner—Mark L. Bell
Assistant Examiner—Scott L. Hertzog
Attorney, Agent, or Firm—Klarquist Sparkman Campbell Leigh & Whinston, LLP

[57] ABSTRACT

A method is disclosed for producing bulking and opacifying pigments for filling paper by the selective aggregation of fine particles in an anionically or cationically dispersed slurry, such that an aggregated structure is formed which contains within it a labyrinth of internal voids or pores. The aqueous slurry is formed at one to thirty percent solids. A low molecular weight agent of opposite ionic charge is then added to the slurry to selectively aggregate the fine particles present. The resultant aggregates are of larger mean particle size than the feed material and contain little or no fine and colloidal particles. The net charge present on the aggregated particles is lower than that of the feed material.

37 Claims, 23 Drawing Sheets

BULKING AND OPACIFYING FILLERS FOR CELLULOSIC PRODUCTS

FIELD OF THE INVENTION

The present invention concerns a method for forming fillers for cellulosic products, and products made using the fillers.

BACKGROUND OF THE INVENTION

Mineral particles, such as calcium carbonate, dolomite, calcium sulphate, kaolin, talc, titanium dioxide and aluminium hydroxide, are often used as fillers and pigments for making cellulosic products, such as paper and paper board. These inorganic materials are incorporated into the fibrous web (or wood pulp slurry) to improve the quality of the cellulosic product. Without such fillers, cellulosic products have poor texture due to discontinuities in the fibrous web. Moreover, the printing characteristics, opacity, brightness and bulk of cellulosic products all benefit by the addition of fillers.

Fillers improve printing characteristics of paper or paper board products by improving surface smoothness, and improving the opacity and brightness of a sheet of paper of a given weight. Additionally, fillers increase the bulk of the cellulosic product, which is important because paper is sold by area, not by weight. Bulky paper can be calendared or "finished" more than thin paper to produce a smoother sheet, which prints better.

However, the web strength of paper products generally declines as filler is substituted for fiber. Preferred fillers are therefore chosen to have minimal impact on fiber-to-fiber bonds while maintaining the strength of the paper web, particularly at high filler levels. There are two basic mechanisms that control retention of a filler in a paper web. These mechanisms are filtration retention and adsorption retention.

The properties which make inorganic materials valuable as fillers are known. They include low abrasion, as well as high brightness and opacifying characteristics. Low abrasion is required so that the cellulosic product can be manufactured easily with conventional machinery. The brightening and opacifying characteristics are important in producing paper or board products which incorporate whiteness, high opacity, good printability and an optimum bulk/weight ratio. The brightness and opacifying characteristics of a filler when incorporated in a sheet of paper may be quantitatively related to a property of the filler known as the "scattering coefficient" or "S." The scattering coefficient is routinely considered in papermaking and has been the subject of many technical papers.

A frequently used filler is titanium dioxide, which can be incorporated into the paper in the form of anatase or rutile. Titanium dioxide has a higher refractive index than other naturally occurring minerals or cellulose fiber and therefore increases the opacity of the paper. However, titanium dioxide is expensive and very abrasive. Thus, despite titanium dioxide's effectiveness as an opacifying filler, its use as a filler is limited and cheaper more satisfactory replacements are desired.

Calcined kaolins are another class of materials used as fillers in papermaking. These minerals are structured, i.e. formed from platelets interconnected or bonded together to form aggregates. The aggregates create a high number of internal voids or pores, which function as light-scattering centers. Unfortunately, these calcined kaolins have higher abrasion than natural or un-calcined kaolins, and are relatively expensive to produce. This limits their applicability as paper fillers. Calcined kaolins, because of their low bulk density, also disrupt the fiber-to-fiber bonds of the paper web at high filler loads, thereby significantly weakening the strength of a sheet of paper relative to other higher bulk density fillers.

Many paper products are manufactured in the neutral or alkaline pH range. These products are very amenable to the inclusion of alkaline metal carbonates and sulfates as fillers, unlike papers made in the acid pH range. One known method for preparing a precipitated alkaline earth metal carbonate is to calcine a naturally occurring metal carbonate, such as limestone or dolomite, to drive off chemically combined carbon dioxide. The alkaline earth metal oxide is slaked in water to form a suspension of the metal earth hydroxide, and then carbon dioxide is passed under controlled conditions through the suspension of the metal hydroxide.

Passaretti et al. (*TAPPI Journal*, Vol. 76 No. 12, 135–140, 1993) describe a range of precipitated alkaline metal earth carbonate fillers and compare them to other fillers. The scalenohedral form of precipitated calcium carbonate imparts the most opacity and bulk to a sheet of paper by virtue of its morphology, which contains internal voids that scatter light. Scalenohedral precipitated calcium carbonate fillers provide bulk to the sheet of paper and can effectively replace titanium dioxide, despite its lower pigment refractive index. However, the high internal pore volume of these fillers substantially retards the drainage of the paper web, and can result in significant slowing of the production rate of a paper machine.

The volume imparted to the cellulosic product by precipitated scalenohedral calcium carbonate, like calcined kaolins, also significantly weakens the fiber-to-fiber bonds in a paper sheet at high filler levels.

Prismatic or rhombohedral precipitated calcium carbonate particles, which contain little or no internal pore volume, can be incorporated into the sheet of paper to help the cellulosic web drain. Manufacturing these precipitated calcium carbonate fillers requires that the reaction temperature of the precipitation process be controlled at very low temperatures. This requires chilling equipment and results in expensive pigments. A major limitation of "prismatic" or rhombohedral precipitated calcium carbonate mineral fillers is that they do not enhance the bulk of a sheet of paper.

SUMMARY OF THE INVENTION

The present invention provides a method for forming fillers for filling cellulosic products, such as paper and paper board. The method, and products made by the method, address many of the shortcomings of known fillers.

In general, the method for producing fillers comprises first providing an ionically dispersed aqueous slurry comprising from about 1 percent to about 30 percent solid mineral particles by weight. The mineral particles are selected from the group consisting of calcium carbonate, calcium hydroxide, magnesium carbonate, magnesium hydroxide, aluminum hydroxide, calcium sulfate and mixtures thereof. Best results are achieved when using mineral suspensions comprising ground natural calcium carbonate or synthetically precipitated calcium carbonate or mixtures thereof. Ground natural calcium carbonate and synthetically precipitated calcium carbonate are typically derived from chalk, limestone or marble.

The mineral particles typically are prismatic, rhombohedral, clustered prismatic or scalenohedral particles, but may be of a variety of morphological forms. Typically the mineral particles are in a mixture that includes "coarse particles" (particles having an equivalent spherical diameter of at least about 0.5 microns) and "fine particles" (particles having an equivalent spherical diameter of less than about 0.5 microns). Of the fine particles in such mixtures, typically some are "ultra-fine particles" (particles having an equivalent spherical diameter of less than about 0.2 microns). The mixtures are formed to contain particles that are sufficiently small in size to be useful as fillers or pigments for making paper and paper board. Due to the methods by which they are formed, it is typical for such mixtures to contain least 30 percent by weight of mineral particles having an equivalent spherical diameter of less than about 2 microns, and generally about 60 percent by weight of the mineral particles have an equivalent spherical diameter of less than about 2 microns. As used herein, the term equivalent spherical diameter refers to the particle size reading obtained from measuring particle mineral size with a Micromeretics SEDIGRAPH® Model 5100.

The invention is practiced using an ionically dispersed suspension of mineral particles, wherein the dispersed suspension has a bulk charge. Ionically dispersed mineral suspensions are commercially available, and have been used for working embodiments of the present invention. Alternatively, aqueous suspensions of mineral particles may be ionically dispersed by adding either anionic or cationic dispersing agents to the suspension. Best results are achieved when using anionic dispersing agents.

If the mineral particles are anionically dispersed, the anionic dispersant generally is selected from homopolymers or copolymers made from the group consisting of carboxylic acid containing vinyl monomers, sulfonic acid containing vinyl monomers, and mixtures thereof. More specifically, the anionic dispersing agent may be selected from the group consisting of polyacrylic acid homopolymers, polyacrylic acid copolymers, methacrylic acid homopolymers and copolymers, and mixtures thereof, with polyacrylic acid being a currently preferred anionic dispersing agent.

Cationic polymeric dispersing agents generally are selected from the group consisting of poly-(alkyl diallyl) quaternary ammonium salts; quaternary ammonium cationic polymers obtained by copolymerizing aliphatic secondary amines with epichlorohydrin; poly (quaternary ammonium) polyether salts that contain quaternary nitrogen in a polymeric backbone chain extended by ether groups; polyamines; copolymers of acrylamide with cationic vinyl monomers; dimethyldiallylammonium chloride; low-molecular-weight polyethyleneimine polyelectrolytes; and mixtures thereof. A currently preferred cationic dispersing agent is dimethylamine epichlorohydrin copolymer.

A low-molecular-weight aggregating agent is then added to the ionically dispersed aqueous slurry in an amount sufficient to selectively aggregate fine particles and ultra-fine particles present in the dispersed slurry. This results in the formation of aggregate particles, each of which contains multiple fine particles that are bound together.

"Low-molecular-weight" aggregating agents useful for practicing the present invention typically have molecular weights, without limitation, of from about 10,000 to about 500,000. The aggregating agent is selected to have a charge opposite the bulk charge of the slurry.

As used herein, the phrase "selective aggregation" refers to a change in particle size distribution of the dispersed feed mineral slurry. This change in particle size distribution occurs upon addition of the selective aggregating agent because the fraction of particles having diameters of less than 0.5 micron is reduced to be below about 30% of the total weight of mineral particles in the slurry. For best results, selective aggregation reduces the fraction of particles measuring less than 0.5 micron in diameter to be below about 10% of the total weight of mineral particles in the suspension. The phrase "non-selective aggregation" refers to a composition in which the fraction of fine particles having diameters of less than 0.5 micron is not reduced to be less than 30% of the total weight of mineral particles in the suspension.

The low-molecular-weight selective aggregating agent can be selected from the group consisting of poly-(alkyl diallyl) quaternary ammonium salts; quaternary ammonium cationic polymers obtained by copolymerizing aliphatic secondary amines with epichlorohydrin; poly (quaternary ammonium) polyether salts that contain quaternary nitrogen in a polymeric backbone chain extended by ether groups; polyamines; copolymers of acrylamide with cationic vinyl monomers; dimethylamine epichlorohydrin copolymers; dimethyldiallylammonium chloride homopolymer; dimethyldiallylammonium chloride copolymer; divalent metal ion salts; trivalent metal ion salts; polyethyleneimine polyelectrolytes; polyacrylic acid homopolymer; polyacrylic acid water-soluble salts; carboxyl containing polymers derived from methacrylic acid, iraconic acid and crotonic acid; and mixtures thereof. Currently preferred low-molecular-weight selective aggregating agents include dimethyldiallylammonium chloride homopolymer as a cationic aggregating agent and polyacrylic acid homopolymer as an anionic aggregating agent.

Divalent metal ion salts useful as selective aggregating agents can be selected from the group of salts consisting of calcium, magnesium, nickel, manganese, copper, zinc and tin salts, and mixtures thereof. For example, the divalent metal ion salt may be selected from the group of salts consisting of magnesium chloride, calcium chloride, magnesium hydroxide, calcium hydroxide, magnesium nitrate, calcium nitrate, and mixtures thereof. The trivalent metal ion salt generally is selected from the group of salts Consisting of aluminum, iron, chromium and titanium salts, and mixtures thereof. For example, the trivalent metal ion salt may be selected from the group consisting of aluminum sulphate, polyaluminum chloride, sodium aluminate, and mixtures thereof.

The amount of the selective aggregating agent added to the ionically dispersed suspension may vary, and is best determined by considering the characteristics desired in the suspension and the cost of the aggregating agent. However, byway of example, the selective aggregating agent may be added to the slurry of ionically dispersed mineral particles in an amount of from about 5 lbs to about 50 lbs per ton of mineral particles, preferably from about 5 lbs to about 25 lbs per ton. However, with some selective aggregating agents, there is little benefit realized from adding amounts greater than about 10 lbs/ton to the dispersed suspension of mineral particles; therefore, the selective aggregating agent also may be added to the slurry of ionically dispersed mineral particles in lesser amounts, such as from about 5 lbs to about 10 lbs per ton of mineral particles.

A working embodiment of the method for producing fillers comprises first providing an ionically dispersed aqueous slurry comprising from about 1 weight percent to about 15 weight percent ground natural calcium carbonate or synthetically precipitated calcium carbonate. The slurry can be purchased as a dispersed slurry, or the method may include the step of adding a dispersing agent to the mineral suspension to provide a slurry. Best results are achieved when the aqueous slurry is anionically dispersed and comprises from about 1 percent to about 10 percent ground natural calcium carbonate or synthetically precipitated calcium carbonate.

The slurry is then selectively aggregated with a cationic low-molecular-weight aggregating agent. About 5 lbs to about 15 lbs per ton of a selective aggregating agent is then added to the dispersed aqueous slurry to selectively aggregate fine and ultra-fine particles present in the slurry. The aggregating agent is selected as discussed above.

The present invention also provides a filler suspension for filling paper and paper board. A working embodiment of the filler suspension comprises an anionically dispersed mineral suspension comprising from about 1 percent to about 15 percent ground natural calcium carbonate or synthetically precipitated calcium carbonate, and preferably from about 5 lbs to about 15 lbs per ton of dimethyldiallylammonium chloride homopolymer.

The process of selectively aggregating the fine and ultra-fine particles in a mineral suspension produces aggregates. The aggregates have a larger mean particle size than the feed mineral slurry and contain little or no fine or colloidal particles free in suspension. The net charge present on the aggregated particles is lower than that of the feed material. The mineral aggregates produced upon addition of the selective aggregating agent have a suitable size and surface charge to be retained well in a fiber web by a combination of filtration retention and adsorption retention. Moreover, the mineral aggregates provide added bulk and opacity to the finished sheet of paper.

Low fiber solids (typically much less than 1%) are also used in the papermaking process to aid good formation of the paper web. One of the many advantages of this invention is that there is no need to concentrate and/or remove the selectively aggregated particles, prior to use as fillers for cellulosic products. The products of this invention can be cost effectively manufactured on-site at the paper mill from a high solids, dispersed, mineral slurry and added or metered directly to the fiber furnish without further modification.

The present invention most effectively uses all of the particles present in a dispersed mineral slurry so that the bulk of the sheet of paper and its opacity are significantly enhanced. The combination of low specific surface area of the aggregated mineral fillers of this invention and low internal porosity provides maximum drainage to the fiber web (or wood pulp slurry) with minimal impact on fiber-to-fiber bonding, or sheet strength. This combination of properties minimizes the drying demand of a paper machine while ensuring that high production rates can be maintained.

DESCRIPTION OF PREFERRED EMBODIMENTS

Figure 1:
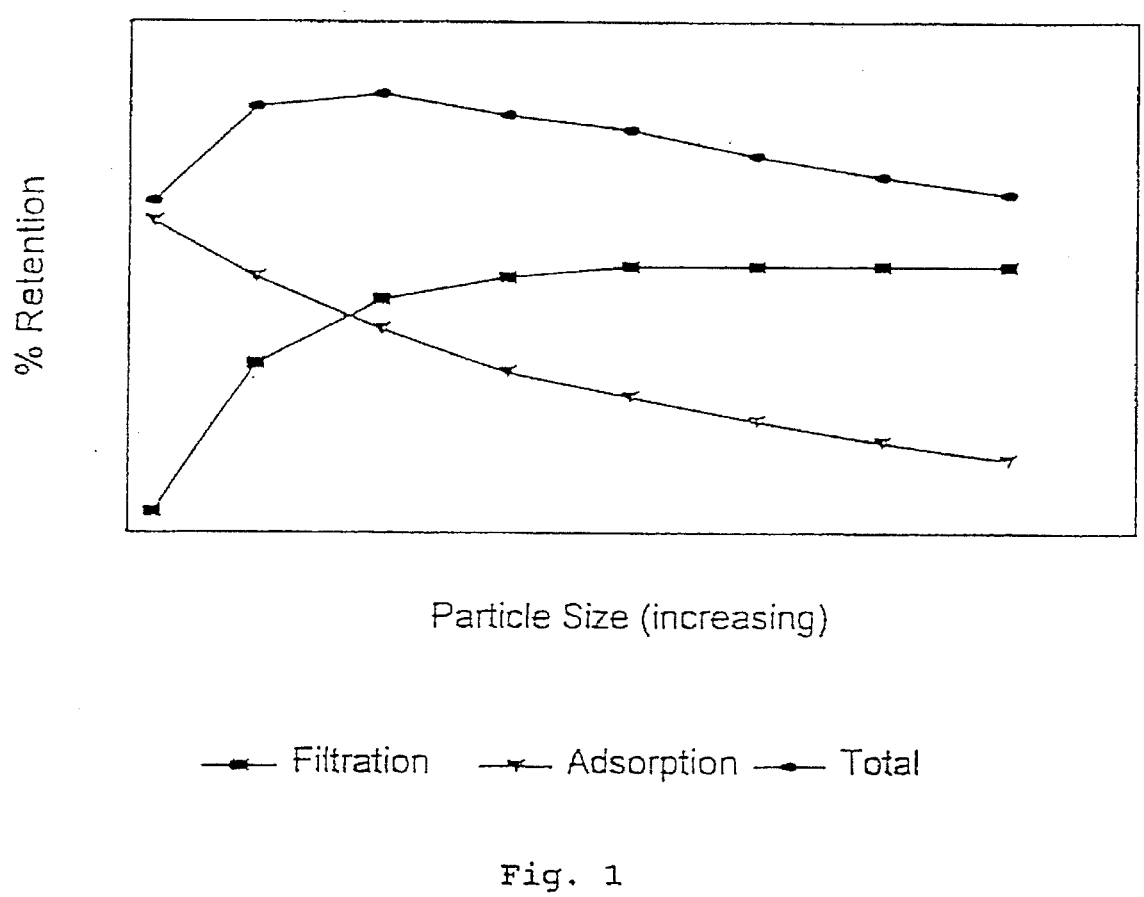
FIG. 1 is a graph of particle size versus percent retention which illustrates the impact of filler particle size on the two retention components; filtration and adsorption.

The present invention concerns fillers, and methods for their production, that are used to make cellulosic products. The fillers are formed using ionically dispersed aqueous suspensions of mineral particles.

I. MINERAL PARTICLES

Suitable minerals include calcium carbonate, calcium hydroxide, magnesium carbonate, magnesium hydroxide, calcium sulfate, aluminum hydroxide, and mixtures thereof. The minerals may be ground or formed by precipitation to provide particles of acceptable size. Slurries of these mineral particles are shipped to paper mills at high solids concentration, such as concentrations of from about 70% to 76%, to provide an affordable supply of the mineral feed material used in this invention. Slurries having lower solids concentrations, such as from 1% to about 30%, which have been produced on-site at a paper mill, or a central production facility and transported to the paper mill, so are preferred feed materials for practicing this invention.

The mineral slurries used to practice the present invention generally consist of a dispersion of naturally ground mineral particles and typically have a range of particle sizes. Preferably, substantially all of the particles of the feed mineral material will have an equivalent spherical diameter of less than about twenty microns. Best results are achieved when at least about thirty percent by weight of the particles in such slurries have an equivalent spherical diameter of less than about two microns. The "fine" fraction of the mineral particles is defined as that fraction of the particles having an equivalent spherical diameter of less than about 0.5 microns. The "ultra-fine" or "colloidal" fraction is defined as that component of the particles having an equivalent spherical diameter of less than about 0.2 microns. The "coarse" fraction of the mineral particles is defined as that fraction of the particles having an equivalent Spherical diameter of at least 0.5 micron. Typically, a mineral slurry having about sixty percent by Weight of the particles finer than two microns will have on the order of about twenty percent by Weight of the particles finer than 0.5 microns. A feed material having about ninety percent by weight of the particles finer than about two microns in equivalent spherical diameter will have on the order of about forty percent by weight of the particles with equivalent spherical diameters under about 0.5 microns. The absolute value of the fines content of a given feed mineral slurry will necessarily depend upon the method of production and the mean particle size of the feed mineral slurry.

A preferred synthetic or precipitated feed mineral slurry contains prismatic, rhombohedral, clustered prismatic or scalenohedral particles Wherein no less than thirty percent by weight of the particles have an equivalent spherical diameter of less than two microns. However, the feed mineral slurry may contain particles of a variety of morphological forms. The fines content of these synthetically produced mineral slurries will depend upon the mean particle size of the product and can include greater than ten percent by weight of particles having equivalent spherical diameters smaller than 0.5 microns. Indeed, some fine synthetic rhombohedral precipitated calcium carbonate products can contain up to eighty percent fines.

II. AQUEOUS SLURRIES OF MINERAL FILLERS

One or more of the minerals discussed above are used to form an aqueous slurry. The aqueous mineral slurry is diluted to have a solids range of from about 1 to about 30 percent by weight, a solids range of from about 1 to about 20 percent by weight is preferred. Best results are achieved by diluting the aqueous mineral slurry from about 1 to no more than 10 percent solids by weight to facilitate selective aggregation (i.e., aggregating the fine particles without also aggregating particles of other sizes) of the fine particles, which possess most of the available surface area.

III. IONICALLY DISPERSED AQUEOUS SLURRIES

The mineral slurries used to practice the invention are ionically dispersed, and preferably are anionically dispersed. Ionically dispersed mineral suspensions can be purchased commercially from such vendors as Columbia River Carbonates of Woodland, Washington. Alternatively, dispersing agents can be added to an aqueous mineral slurry to disperse the mineral particles. Such a slurry can be ionically dispersed by adding either an anionic or cationic dispersing agent to the aqueous slurry of mineral particles.

Lower solids mineral slurries may naturally carry a net negative surface charge, or may be dispersed with an anionic polyelectrolyte dispersant to facilitate transportation, or with one or more of the cationic polyelectrolytes (cationically charged agents) described below. The term "polyelectrolyte" (or "ionically charged agent") as used herein refers to a polymer or molecular species with a net positive or net negative charge. Cationically charged agents have a deficiency of electrons or electron density. Anionically charged agents have an excess of electrons or electron density.

A. Anionic Dispersing Agents

The anionic dispersing agents used to practice the present invention generally are polymers or copolymers of carboxylic or sulfonic acid containing vinyl monomers, such as acrylic acid and methacrylic acid. As used herein, the term "polymer" refers to macromolecules formed by the chemical union of five or more combining units called monomers. Also as used herein, the term "copolymer" refers to a polymer comprised of two or more dissimilar monomers, and the term "homopolymer" refers to synthetic or natural polymers formed from a single monomer. The homopolymers or copolymers used as anionic dispersing agents typically have molecular weights in the range of from about 1,000 to about 10,000, with a preferred molecular weight being about 5,000.

For best results the anionic dispersing agents are homopolymers or copolymers comprising one or more of acrylic acid, methacrylic acid, carboxylic acid containing vinyl monomers and sulfonic acid containing vinyl monomers. The currently most preferred anionic dispersing agent is polyacrylic acid homopolymer.

The polymers of acrylic acid, methacrylic acid and carboxylic acid containing vinyl monomers may be represented by Formula (1):

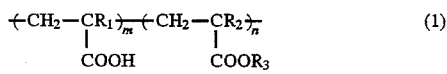

wherein $R_1$–$R_3$ are independently selected from the group consisting of hydrogen and lower alkyl groups, so that when $R_1$ is hydrogen and $R_2$ is a lower alkyl, these are acrylic copolymers, when $R_1$ and $R_2$ are both hydrogen, these are acrylic acid homopolymers and when $R_1$ is a methyl group, these are methacrylic acid copolymers.

As used herein, the term "lower alkyl" refers to compounds having eight or fewer carbon atoms and includes both straight chain and branched chain compounds. The copolymers of sulfonic acid containing vinyl monomers may be represented by Formula (2):

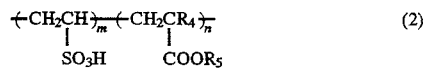

wherein $R_4$ and $R_5$ are independently selected from the group consisting of hydrogen and lower alkyl groups.

B. Cationic Dispersing Agents

The mineral slurries used to practice the present invention can be cationically dispersed using cationic polymeric electrolytes. A number of cationic dispersing agents also can be used as selective aggregating agents. Cationic dispersing/selective aggregating agents useful for practicing the invention are described below. The currently preferred cationic dispersing agent is dimethylamine epichlorohydrin copolymers. The cationic dispersant homopolymer or copolymer also should be of low molecular weight, such as from about 1,000 to about 20,000, with best results achieved from about 5,000 to about 10,000.

IV. AGGREGATING AGENTS

A low-molecular-weight cationic or anionic selective aggregating agent is added to the ionically dispersed mineral slurry to aggregate the fine particles. A cationic or anionic agent, selected to have a charge opposite that of the ionically dispersed slurry, is added in an amount sufficient to cause the fine particles to selectively aggregate. For instance, if the mineral slurry is anionically dispersed, then a cationic aggregating agent is used to aggregate the fine particles, and vice versa. Since anionically dispersed slurries are preferred for practicing the present invention, cationic aggregating agents also are preferred. Combinations of plural cationic aggregating agents, or combinations of plural anionic aggregating agents, also can be used to aggregate the fines.

The amount of the selective aggregating agent added to the ionically dispersed mineral slurry varies depending upon factors such as the nature of the mineral particles used, the concentration of the mineral particles in the slurry and the nature of the aggregating agent. However, it appears that the best operation occurs with the addition of about 5 lbs to about 50 lbs aggregating agent per ton of mineral solids, preferably about 5 lbs to about 15 lbs per ton. Higher amounts can be used without detrimental effects. Full selective aggregation typically requires the addition of at least about 5 lbs per ton.

The following paragraphs discuss particular aggregating agents that have been found to be useful in the practice of the invention. The particular aggregating agents discussed are intended to be illustrative only. It should be understood that any aggregating agent, including any mixture of aggregating agents now known or hereinafter developed, can be used to practice the invention, as long as such agent selectively aggregates fine mineral particles in the manner discussed herein, and does not detract from the use of the treated slurries for the production of cellulosic products.

A. Cationic Aggregating Agents

The ionically dispersed mineral slurries used to practice the present invention can be selectively aggregated using cationic polyelectrolytes. The cationic aggregating agent preferably has a low molecular weight, such as from about 1,000 to about 20,000, and from about 5,000 to about 10,000 producing best results. Water-soluble polymeric cationically charged agents are well known in the art. Generally, such materials do not contain negatively charged or electronically polarized groups, such as carboxyl or carbonyl groups.

One example of a class of cationic aggregating agents is poly (quaternary ammonium) compounds, such as poly (alkyl diallyl quaternary ammonium) salts. In addition to poly (alkyl diallyl quaternary ammonium) salts, other suitable quaternary ammonium cationic polymers can be obtained by copolymerizing aliphatic secondary amines with epichlorohydrin. Still other water-soluble cationic polyelectrolytes are poly (quaternary ammonium) polyether salts that contain quaternary nitrogen in a polymeric backbone and are chain extended by ether groups. These compounds are prepared from water-soluble poly (quaternary ammonium) salts containing pendant hydroxyl groups and bifunctionally reactive chain extending agents; such polyelectrolytes are prepared by treating an N,N,N,N-tetralkylhydroxyalkenediamine and an organic dihalide such as dihydroalkane or a dihaloether with an epoxy haloalkane. See U.S. Pat. No. 3,663,461 for the synthesis of poly (quaternary ammonium) polyether salts, which patent is incorporated herein by reference. Polyamines, copolymers of acrylamide with cationic vinyl monomers, dimethylamine, epichlorohydrin copolymers, dimethyldiallyammonium chloride homopolymers and copolymers, divalent and trivalent metal ion salts and polyethyleneimines are also currently preferred.

1. Alkyl diallyl quaternary ammonium salts

Polymers of alkyl diallyl quaternary ammonium salts may be represented by Formula (3):

wherein $R_6$ and $R_7$ are independently selected from the group consisting of hydrogen, methyl groups, ethyl groups and lower alkyl groups. A preferred cationically charged agent is poly(dimethyldiallylammonium chloride), which is represented by the formula above when $R_6$ and $R_7$ are methyl groups.

A poly (dimethyldiallylammonium chloride) cationic polyelectrolyte commercially available under the trademark designation Agefloc WT50 SLV from the CPS Chemical Company, having a molecular weight estimated to be between 10,000 and 50,000, has been found to be particularly useful in the present invention. However, the invention is not limited to Agefloc WT50 SLV since other cationic polyelectrolytes appear to provide equivalent, if not superior results. Other cationic polyelectrolytes available from the CPS Chemical Company that have been shown to be useful in the present invention are; Agefloc WT 40 which has a molecular weight estimated to range from 200,000 to 400,000; Agequat C1405 which has a molecular weight estimated to range from 200,000 to 400,000; Agefloc B50 which has a molecular weight estimated to range from 10,000 to 50,000; and Agefloc A50 LV which has a molecular weight estimated to range from 200,000 to 400,000.

2. Poly (quaternary ammonium) polyether salts

Poly (quaternary ammonium) polyether salts that contain quaternary nitrogen in a polymeric backbone and are chain extended by ether groups may be represented by Formula (4):

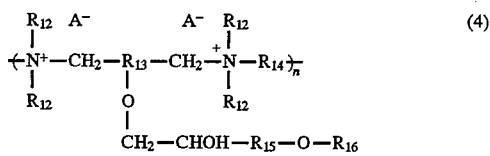

wherein $R_{12}$ is a lower alkyl group, $R_{13}$ is the residue of a hydroxy substituted lower alkylene group containing 10 or fewer carbon atoms, $R_{14}$ is an organic radical selected from the group consisting of alkylene groups containing four and fewer carbon atoms and a $(CH_2)_n$—O—$(CH_2)_3$ group where n is an integer from one to four, $R_{15}$ is an alkylene group containing one to four carbon atoms, $R_{16}$ is selected from the group consisting of terminal hydrogen and $R_{13}$, and A is an anion selected from the group consisting of chloride, bromide and iodide. For best results the polyether compounds described above would have a molecular weight in the range of 20,000 to 500,000.

3. Quaternary ammonium polymers from secondary amines polymerized with epichlorohydrin Polymers of quaternary ammonium monomers obtained by copolymerizing aliphatic secondary amines with epichlorohydrin may be represented by Formula (5):

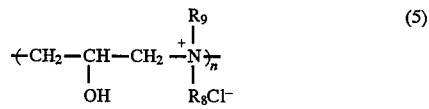

wherein $R_8$ and $R_9$ are independently selected from the group consisting of hydrogen, and lower alkyl groups. Another preferred polymeric cationic polyelectrolyte is polydimethylamine/epichlorohydrin copolymer represented by formula (5) when $R_8$ and $R_9$ are methyl groups.

4. Water-soluble polyamines

Other water-soluble cationic polyelectrolytes are polyamines which are usually supplied under commercial trade designations. Copolymers of acrylamide with cationic vinyl monomers or low-molecular-weight polyethyleneimine polyelectrolytes could also be used in this invention.

Suitable cationic polyelectrolyte polyamines may be represented by Formula (6):

wherein $R_{10}$ is selected from the group consisting of $NHR_2$ and $C(O)NHR_2$ and $R_{11}$ is selected from the group consisting of hydrogen and lower alkyls. Another preferred polymeric cationic polyelectrolyte is polyethyleneimine represented by the formula above when $R_{10}$ and $R_{11}$ are hydrogen. Another preferred polymeric cationic polyelectrolyte is polyacrylamide, represented by the formula above when $R_{10}$ is hydrogen and $R_{11}$ is C(O)NH. For best results the polymer would have a molecular weight in the range of 20,000 to 500,000.

The cationic polyelectrolyte polymers also have low molecular weight for best results. "Low molecular weight" as used in this context refers to molecular weights no greater than 500,000. Cationic potato starch is reported as having an estimated molecular weight of from about 3,000,000 to about 3,500,000, while corn starch is reported as having a molecular weight ranging from about 800,000 to about 1,800,000. Because of their high molecular weights, most such cationic polyelectrolytes are not preferred for use in the present invention. However, cationic starches, cationic guar gum, or other modified polysaccharides could act as preferred aggregating agents in this invention if they are of sufficiently low molecular weight.

5. Divalent and trivalent salts

Salts of divalent and trivalent metal ions, such as calcium, magnesium, iron and aluminum, also can be used as cationic aggregating agents. Examples of such salts include, but are not restricted to, calcium hydroxide, magnesium hydroxide, calcium nitrate, magnesium nitrate, magnesium chloride, aluminum sulphate (papermakers alum), sodium aluminate, polyaluminum chloride (PAC) and calcium chloride.

The filler materials produced as discussed above are used in the fashion of prior filler materials. For example, a filler material according to the present invention can be fed to a paper-making machine in the manner of a standard paper-making filler slurry.

B. Anionic Aggregating Agents

If the mineral slurry is cationically dispersed, then an anionic aggregating agent is used to selectively aggregate the fines. Anionic aggregating agents include polyacrylic acid homopolymers, polyacrylic acid water soluble salts, carboxyl containing polymers derived from methacrylic acid, itaconic acid and crotonic acid for best results.

The following examples are intended to be illustrative of the invention only, and should not be interpreted to limit the invention to the particular features discussed therein.

The materials used to practice the following examples were selected from the following:

1. Mineral Slurries

High-solids fine-ground calcium carbonate slurries: Microna 3, Microna S-80 B, Microna S-90 HB and Microna S-93 from Columbia River Carbonates, of Woodland, Wash.

Precipitated Calcium Carbonate

Precipitated calcium carbonate slurries Albacar LO, a coarse particle size scalenohedral morphology pigment; Albacar HO, a fine particle size scalenohedral morphology pigment; Albafil a fine particle size rhombohedral morphology pigment and SX 1000, a course clustered prismatic morphology pigment produced by Specialty Minerals Inc. of Easton, Pa.

3. Cationic Polyelectrolytes

Dimethyldiallylammonium chloride homopolymer cationic polyelectrolytes Agefloc WT50 SLV, Agefloc WT40, dimethlydiallylammonium chloride copolymer Agequat C1405, and dimethylamine/epichlorohydrin copolymers Agefloc B50, Agefloc A50 LV from the CPS Chemical Company, Inc., of Old Bridge, N.J.

4. Anionic Polyelectrolytes

Acumer 9400, a polyacrylic acid homopolymer, available from Rohm & Hass Co., of Philadelphia, Pa., with a molecular weight between 1,000 and 10,000.

5. Cationic Starch

Cationic potato starch, Westcat E-F, from Western Polymer Corporation of Longwood, Fla.

6. Laboratory Handsheets

Handsheets were made with a British sheet mould according to TAPPI procedure T 205 om-88. Handsheet samples were temperature and humidity conditioned according to TAPPI T 402 "Standard Conditioning and Testing Atmospheres for Paper, Board, Pulp Handsheets, and Related Products". All physical tests on the handsheet samples were carried out in accordance with TAPPI procedure T 220 "Physical Testing of Handsheets." Pulp drainage measurements were carried out in accordance with TAPPI procedure T221 "Drainage Time of Pulp." The data presented is interpolated data at ten, fifteen, twenty and twenty-five percent ash values. Ten separate handsheets were made and measured for each filler level according to TAPPI procedure T 205 om-88.

The following test equipment was used to evaluate the physical properties of handsheets made stated in the examples below: Thwing-Albert Inst. Co., Model 323, Digital Opacimeter; Teledyne Corp., Techibrite Micro-TB-1C; Electronic Microgage, Emveco, 210-dh; Lorentzen and Wetre, Type 14-2 Burst-O-Matic.

EXAMPLE 1

A sample of dry, air classified, ground limestone (Microna 7) with a mean particle size of seven microns was slurried in water at a solids concentration of forty percent. To this slurry was added three lbs/t of a cationic polyelectrolyte, Agefloc AS0 LV. The resultant mixture was ground in a laboratory Dyno-Mill, KDL Pilot media mill. Sixty percent by weight of the particles in the product were smaller than two microns, and eleven percent by weight of the particles were smaller than 0.5 microns. This cationically dispersed, fine ground calcium carbonate mineral slurry, designated SF 1, had a particle surface charge of +42.1 μeg/g, as determined with a Mutek POD 02 Particle Charge Detector.

EXAMPLE 2

A sample of Microna S-90 HB was obtained. Microna S-90 HB is a commercially available, anionically dispersed, ground calcium carbonate pigment slurry. Ninety percent by weight of the particles in Microna S-90 HB are smaller than two microns, and forty percent by weight of the particles are smaller than 0.5 microns. A sample of Microna S-90 HB was diluted from a concentration of about 75 percent solids to ten percent solids by weight in water. To this feed mineral suspension was added, with stirring, a solution of one percent (weight/weight in water) cationic potato starch, Westcat E-F, having an estimated molecular weight of from about 3,000,000 to 3,500,000. Three lbs/t and six lbs/t cationic starch were added to the Microna S-90 HB (dry on dry) feed mineral slurry.

The particle surface charge of the anionically dispersed Microna S-90 HB mineral slurry was about −36 μeg/g. After treatment with 3 lbs/t of the cationic potato starch, the mineral surface charge was reduced to about −11 μeg/g. After treatment with six lbs/t of the cationic potato starch the mineral surface was about −8 μeg/g.

Figure 2:
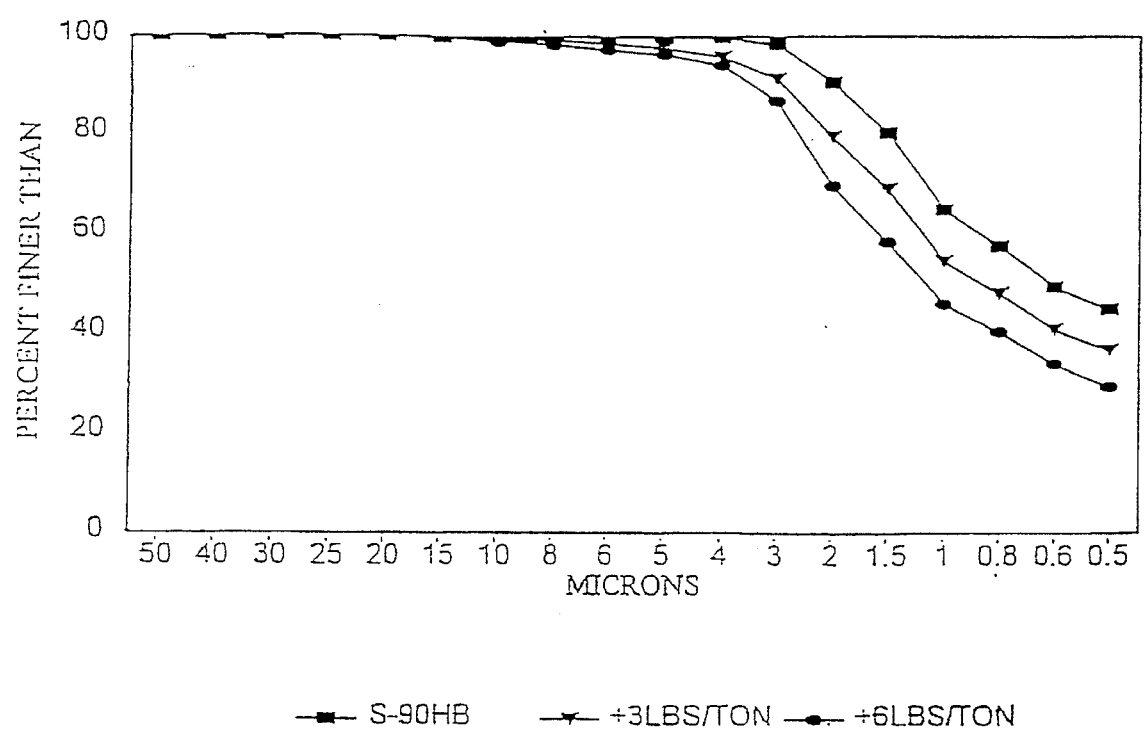
FIG. 2 is a graph of particle size in microns versus the percent of particles finer than the stated sizes which illustrates the effect of adding three lbs/t and six lbs/t high-molecular-weight cationic starch on the particle size distribution curve of an anionically dispersed mineral slurry at ten percent solids.

FIG. 2 shows the impact Of the cationic starch treatment on the particle size distribution of Microna S-90 HB slurries formulated as described in Example 2. The particle size was determined using a Micromeritics "Sedigraph 5100" particle-size analyzer upon addition of 3 lbs/t (0.15 weight percent) and 6 lbs/t (0.3 weight percent) cationic starch. FIG. 2 illustrates that as the amount of cationic starch increases, the particles generally flocculate. The particle size curves are simply displaced to higher mean particle size at higher cationic starch weight percents. At six lbs/t cationic starch treatment level, particles smaller than 0.5 microns constitute thirty percent by weight of the mineral slurry.

EXAMPLE 3

A sample of Microna S-80 B was obtained. Microna S-80 B is a commercially available, anionically dispersed, ground calcium carbonate pigment slurry. Eighty percent by weight of the particles in Microna S-80 B are smaller than two microns, and forty percent by weight of the particles are smaller than 0.5 microns. Microna S-80 B was diluted from a concentration of about 75 percent solids to a range of differing solids levels (1%, 10%, 15%, 20% and 30%) with water. To these mineral suspensions was added, with stirring, a solution of one percent (weight/weight in water) of the cationic polyelectrolyte Agefloc WT50 SLV which has an estimated molecular weight of from about 10,000 to about 50,000. Five lbs/t Agefloc WT50 SLV to Microna S-80 B (dry on dry) were used for all the treatment experiments.

Figure 3:
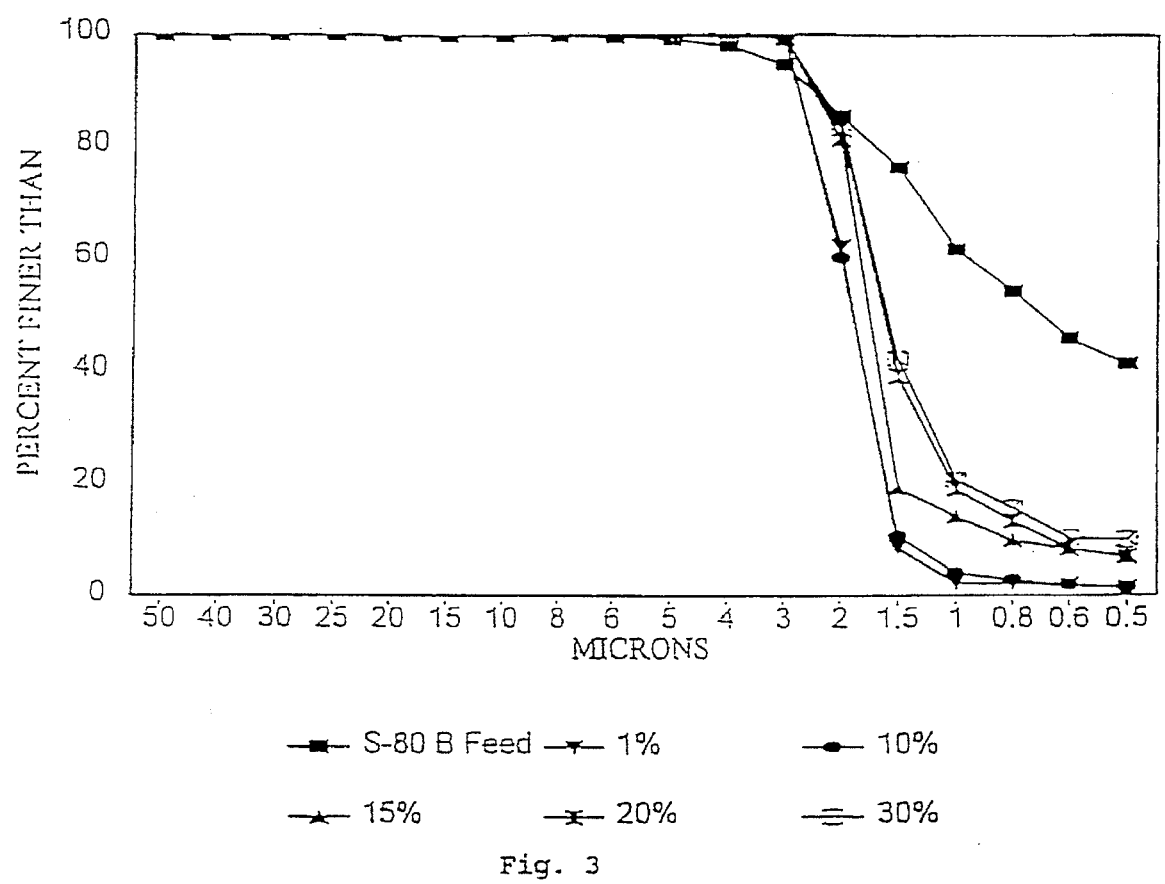
FIG. 3 is a graph of particle size in microns versus the percent of particles finer than the stated sizes that illustrates the expected effect of a five lbs/t addition of a low-molecular-weight cationic polyelectrolyte (Agefloc WT50 SLV) on the particle size distribution curve of an anionically dispersed mineral slurry at a range of treatment solids levels.

FIG. 3 illustrates that the addition of a low-molecular-weight cationic polyelectrolyte to a dispersed feed mineral slurry having an anionically charged surface results in selective aggregation of the fine component of the feed material when the treatment is carried out at low solids. FIG. 3 also illustrates that complete aggregation of the fines present in the feed mineral slurry occurs if the mineral feed slurry is ten percent solids or lower prior to treatment with the low-molecular-weight cationic polyelectrolyte.

EXAMPLE 4

Microna S-90 HB was diluted to ten percent solids by weight in water. To this feed mineral suspension was added, with stirring, a solution of one percent (weight/weight in water) cationic polyelectrolyte Agefloc WT50 SLV. One, three and five lbs/t Agefloc WT50 SLV to Microna S-90 HB (wet polymer on dry mineral) were added to the feed mineral slurry.

The particle charge of the Microna S-90 HB feed mineral slurry was reduced from about −36 μeg/g to about −7 μeg/g with the addition of five lbs/t Agefloc WT50 SLV. The median particle diameter of the treated mineral slurry increased from a value of about 0.6 microns for the feed suspension to about two microns for the mineral slurry treated with 5 lbs/t of the cationic polyelectrolyte.

Figure 4:
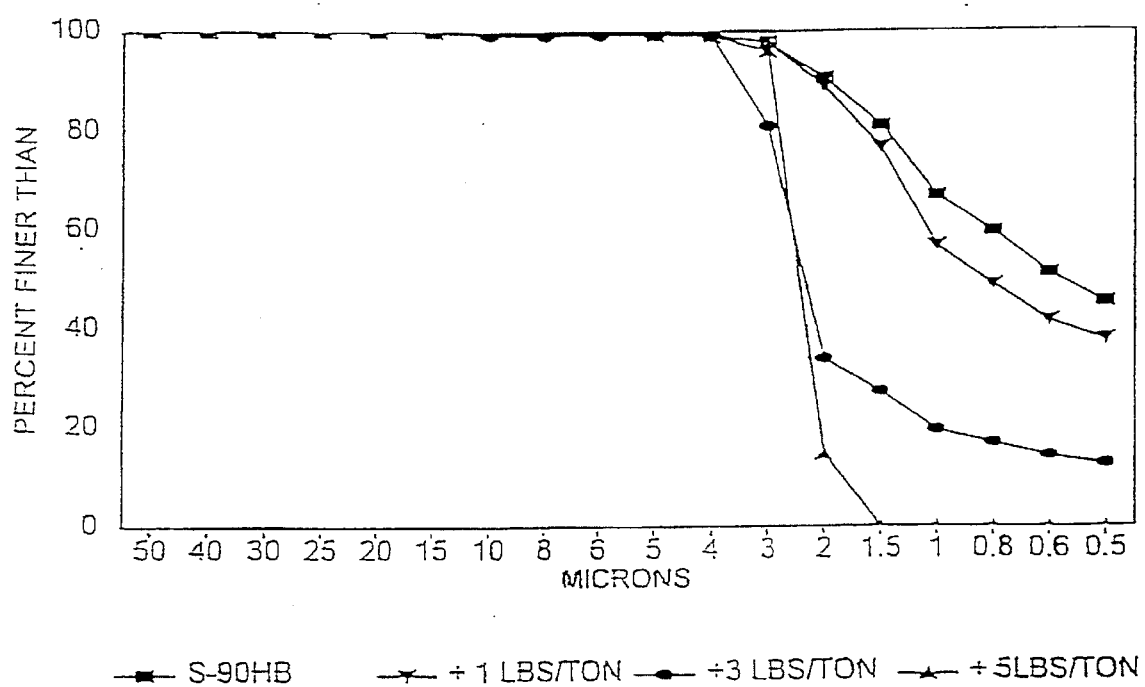
FIG. 4 is a graph of particle size in microns versus the percent of particles finer than the stated sizes that illustrates the effect of adding increasing quantities of a low-molecular-weight cationic polyelectrolyte (Agefloc WT50 SLV) on the particle size distribution curve of an anionically dispersed mineral slurry at ten percent solids.

FIG. 4 illustrates the particle size curve of Microna S-90 HB after treatment with various levels of Agefloc WT50 SLV. As can be seen, a five lbs/t treatment with the low-molecular-weight cationic polyelectrolyte selectively aggregates all of the fine particles present in the feed mineral slurry.

EXAMPLE 5

An aqueous sample of Microna S-90 HB was diluted to ten percent solids by weight in water. To this mineral suspension was added in separate experiments, with stirring, a solution of one percent (weight/weight in water) of the cationic polyelectrolytes Agequat C1405, Agefloc B50, Agefloc WT40 and Agefloc A50 LV, which have estimated molecular weights in the range of from about 10,000 to about 400,000 as outlined above. Five lbs/t were used for all the individual cationic polyelectrolyte treatment experiments.

Figure 5:
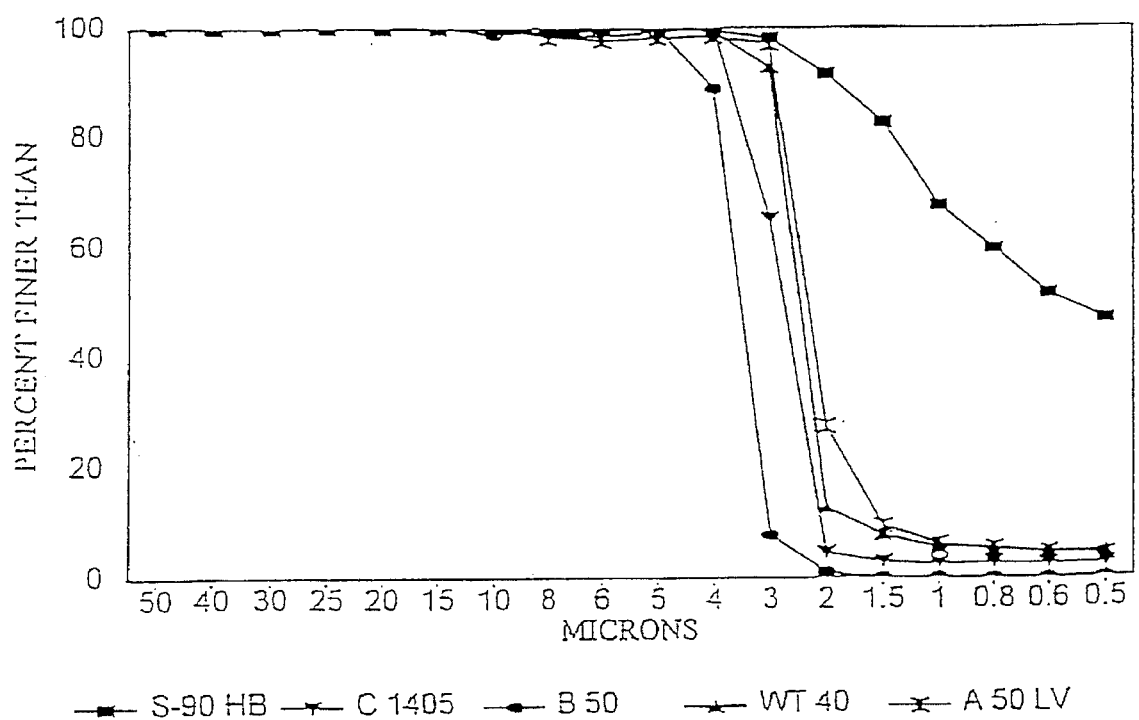
FIG. 5 is a graph of particle size in microns versus the percent of particles finer than the stated sizes that illustrates the effect of adding a number of different low-to-medium molecular weight cationic polyelectrolytes, at five lbs/t, on the particle size distribution curve of an anionically dispersed mineral slurry at ten percent solids.

FIG. 5 illustrates the impact of these cationic polyelectrolyte treatments on the particle size curve of Microna S-90 HB. All of the polymer treatments chosen selectively aggregate the fine component of the feed material. The mean particle size of the resultant products and surface charges are shown in Table I, below.

TABLE I

| Polymer (5 lbs/t) | Mean particle size (microns) | Surface charge ($\mu$eg/g) |
| --- | --- | --- |
| None (feed) | 0.58 | −37.0 |
| Agequat C1405 | 2.82 | −10.6 |
| Agefloc B50 | 3.51 | −7.66 |
| Agefloc WT40 | 2.27 | −6.89 |
| Agefloc A50 LV | 2.28 | −8.00 |

EXAMPLE 6

Microna 3 is a commercially available, air-classified, fine-ground calcium carbonate pigment. A sample of Microna 3 was slurried at seventy percent solids, along with an anionic dispersant, Acumer 9400. Thirty-five percent by weight of the particles in Microna 3 are smaller than two microns, and ten percent by weight of the particles are smaller than 0.5 microns. A sample of Microna 3 slurry was further diluted to ten percent solids by weight in water. A solution of one percent (weight/weight in water) of the cationic polyelectrolyte Agefloc WT50 SLV was added to this mineral suspension, with stirring. One, three and five lbs/t Agefloc WT50 SLV to Microna 3 (wet polymer on dry mineral) were added to the mineral slurry.

Figure 6:
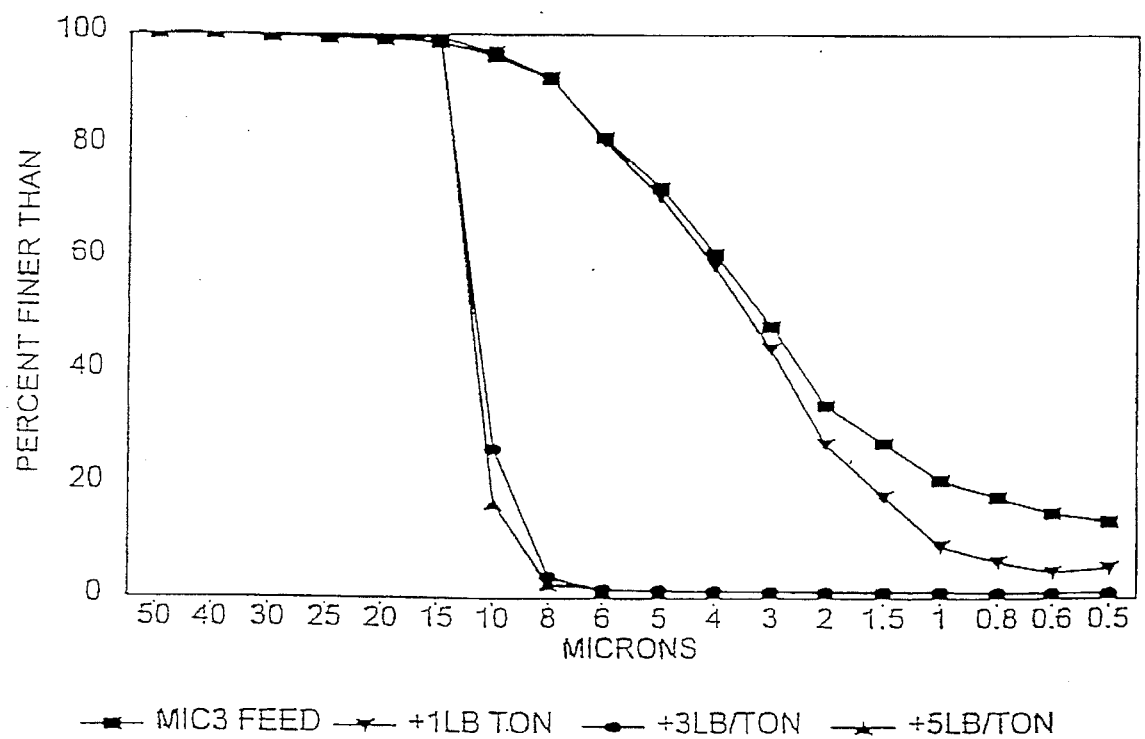
FIG. 6 is a graph of particle size in microns versus the percent of particles finer than the stated sizes that illustrates the effect of adding increasing quantities of the low-molecular-weight cationic polyelectrolyte Agefloc WT50 SLV on the particle size distribution curve of an anionically dispersed slurry of Microna 3.

FIG. 6 illustrates the results of adding the cationic polyelectrolyte to the anionically dispersed slurry of Microna 3. FIG. 6 illustrates that adding three lbs/t of the cationic polyelectrolyte Agefloc WT50 SLV aggregates the Microna 3 so that no fine particles remain free in the mineral suspension. The relatively Coarse mean particle size of Microna 3, 3.14 microns, results in a relatively coarse aggregated product with a mean particle size of about eleven microns. The charge of the product from this experiment should be about −18 $\mu$eg/g, which is substantially lower than the feed mineral slurry (−30 $\mu$eg/g).

EXAMPLE 7

A sample of Microna S-80 B was diluted to a solids level of ten percent with water. To this suspension was added, with stirring, a solution of one percent (weight/weight in water) of the cationic polyelectrolyte Agefloc WT50 SLV. Additions of five, seven, nine, eleven and thirteen lbs/t Agefloc WT50 SLV to Microna S-80 B (wet polymer on dry mineral) were used for the experiments.

Figure 7:
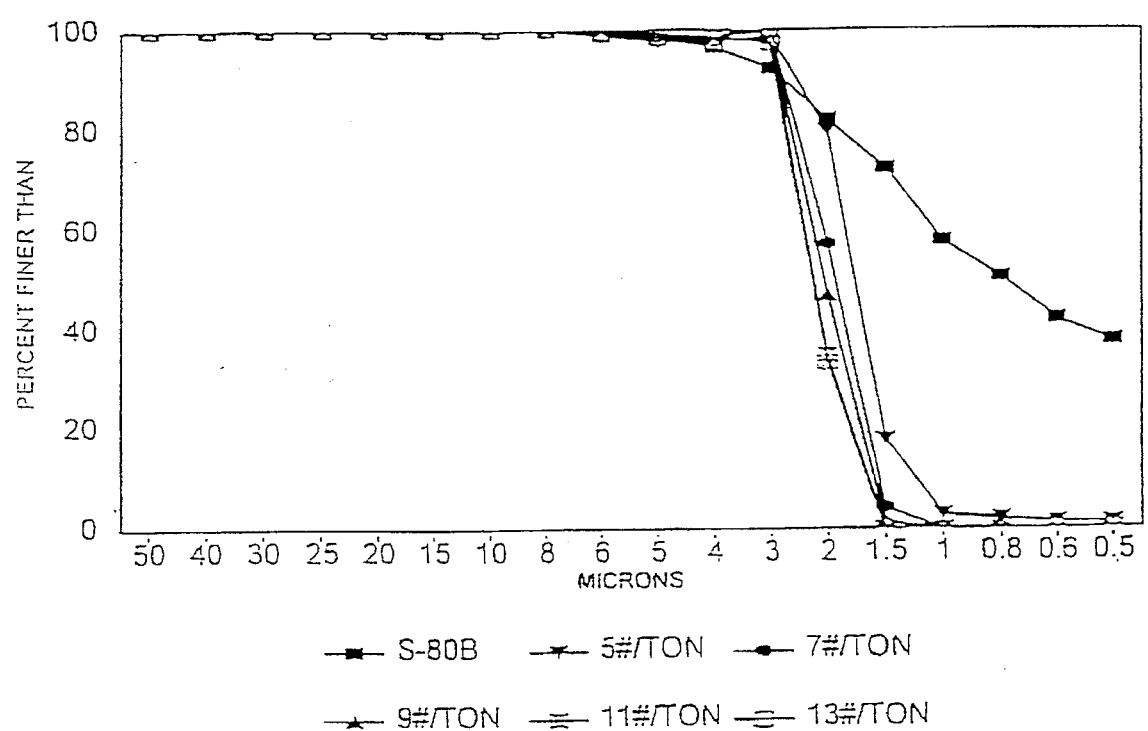
FIG. 7 is a graph of particle size in microns versus the percent of particles finer than the stated sizes that illustrates the effect of increasing the weight percent of Agefloc WT50 SLV on the particle size distribution curve of Microna S-80 B treated at ten percent solids.

FIG. 7 illustrates that the addition of a low-molecular-weight cationic polyelectrolyte to the anionically surface charged and dispersed feed pigment slurry results in selective aggregation of the fine component of the feed material when the treatment is carried out at low solids. Increasing the weight percent of the cationic polyelectrolyte above 5 lbs/t did not substantially change the mean particle size of the resultant aggregated product, but did further reduce the surface charge of the product as can be seen from the data in Table II below.

TABLE II

| Polymer (lbs/t) | Mean particle size (microns) | Surface charge ($\mu$eg/g) |
| --- | --- | --- |
| Feed S-80 B | 0.79 | −21.30 |
| 5 lbs/t WT50 SLV | 1.86 | −11.41 |
| 7 lbs/t WT50 SLV | 1.99 | −9.89 |
| 9 lbs/t WT50 SLV | 2.02 | −8.86 |
| 11 lbs/t WT50 SLV | 2.13 | −7.66 |
| 13 lbs/t WT50 SLV | 2.14 | −3.01 |

EXAMPLE 8

A large sample of Microna S-80 B was diluted to ten percent solids and treated with five lbs/t of Agefloc WT50 SLV as in Example 7 above. This sample will be referred to as SF 2.

Figure 8:
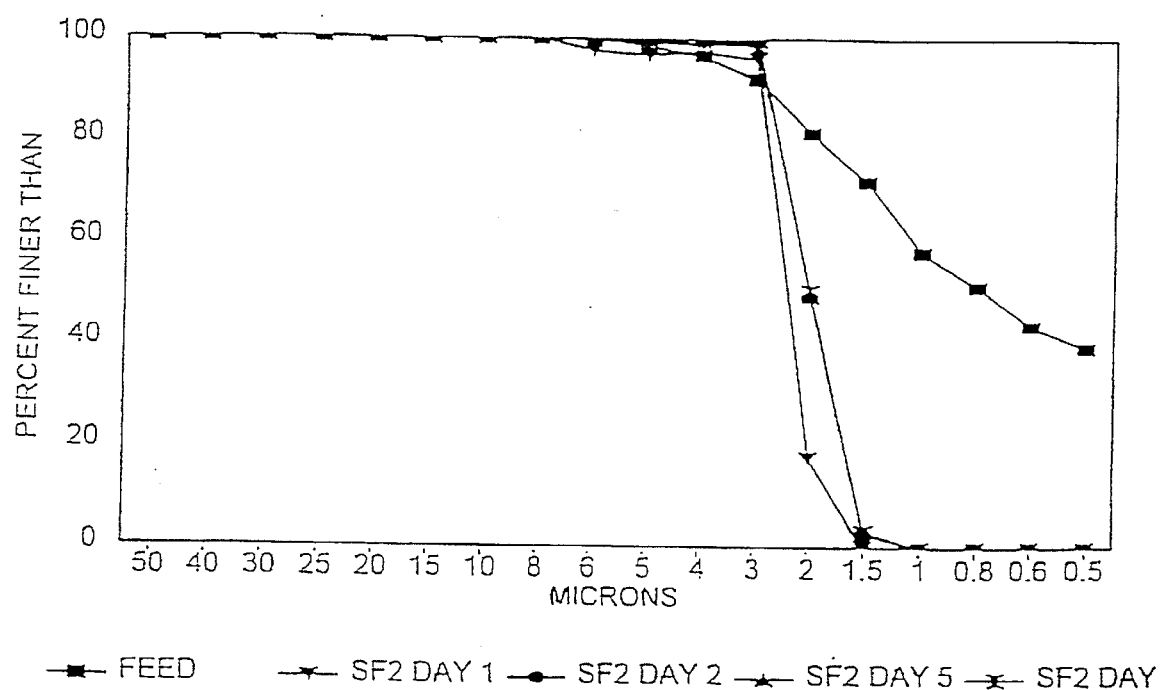
FIG. 8 is a graph of particle size in microns versus the percent of particles finer than the stated sizes that illustrates the effect of stirring on the particle size distribution curve of a suspension of SF 2 over a six-day period.

A portion of SF 2 was stirred for a period of about 6 days with a laboratory mixer. Aliquots of the product were tested for particle size distribution during that time period. FIG. 8 shows that once aggregation of the fine particles occurs, it is very difficult, if not impossible, to change the particle size distribution of the product. No fines are expected to be released or generated during the six-day stirring period.

EXAMPLE 9

A large sample of Microna S-80 B was diluted to ten percent solids and treated with five lbs/t of Agefloc B50 as in Example 3 above. This sample will be referred to as SF 3. The mean particle size of this product was about 3.5 microns, and the particle surface charge about −8 $\mu$eg/g.

EXAMPLE 10

A large sample of Microna S-80 B was diluted to ten percent solids and treated with thirteen lbs/t of Agefloc WT50 SLV as in Example 3 above. This sample will be referred to as SF 4. The mean particle size of this product was about two microns, and the particle surface charge was about −3 $\mu$eg/g.

EXAMPLE 11

Figure 9:
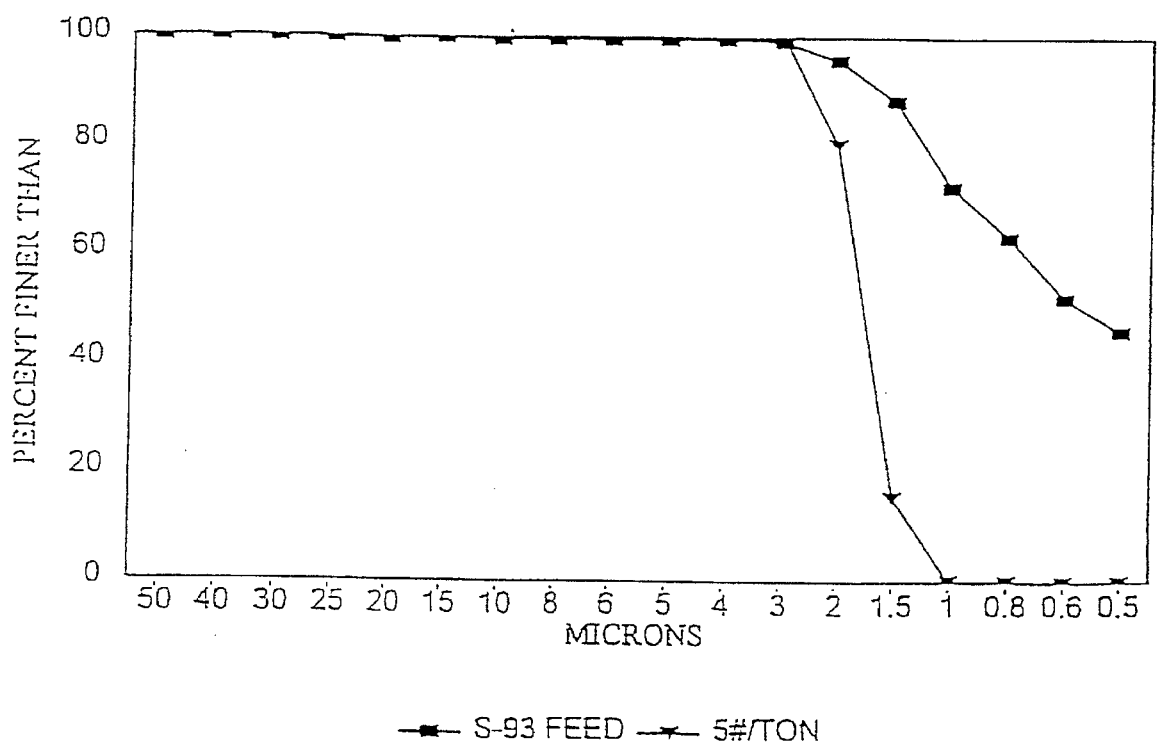
FIG. 9 is a graph of particle size in microns versus the percent of particles finer than the stated sizes that illustrates the effect of adding five lbs/t of the cationic polyelectrolyte Agefloc WT50 SLV to a ten percent solids suspension of Microna S-93.

Microna S-93 is a commercially available, anionically dispersed, ground calcium carbonate pigment slurry at a concentration of about 75 percent solids. Ninety-three percent by weight of the particles in Microna S-93 are smaller than two microns, and seventy-one percent by weight of the particles are smaller than one micron. A sample of Microna S-93 was diluted to ten percent solids and treated with a solution of one percent (weight/weight in water) of the cationic polyelectrolyte Agefloc WT50 SLV. Five lbs/t polymer to mineral were used. This sample will be referred to as SF 5. The mean particle size of this product was about 1.8 microns, and the particle surface charge was about −20 $\mu$eg/g. FIG. 9 displays the impact of adding the cationic polyelectrolyte on the particle size distribution of Microna S-93. No fine particles were present in suspension after the treatment.

EXAMPLE 12

By way of comparing the present invention to currently available paper filler mineral pigments, a series of laboratory handsheets were made using a blend of thirty percent hardwood, forty percent secondary fiber and thirty percent long fiber. The following polymer wet-end additives were sequentially added to the fiber blend with mixing; fifteen lbs/t of cationic potato starch, 1.5 lbs/t of ASA size and 0.4 lbs/t of an anionic retention aid. Final pulp consistency was about 0.3 percent. To samples of the furnish, with all of the additives present, was added varying amounts of the filler pigments Albacar LO, Microna S-80 B and SF 2.

Figure 10:
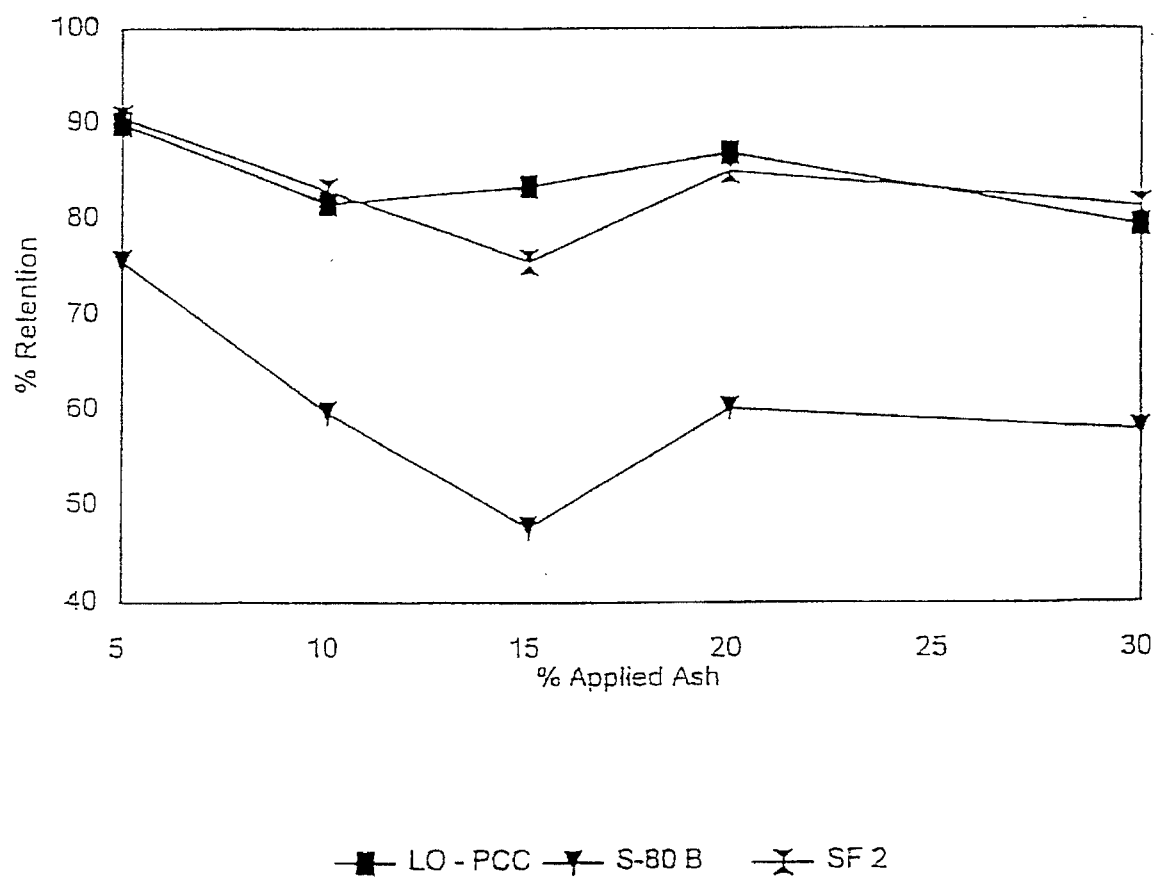
FIG. 10 is a graph of percent applied ash versus percent retention that illustrates the percent ash retention values for Albacar LO, Microna S-80 B and SF 2 as a function of applied ash.

FIG. 10 illustrates the relationship between the applied ash (added to the furnish) and the final ash in the paper web for the various filler pigments. Percent retention is defined as (final ash)/(applied ash)×one hundred percent. FIG. 10 illustrates that SF-2 has retention characteristics similar to the coarse, bulky scalenohedral Albacar LO pigment. SF-2 is significantly better retained than the untreated highly anionically surface charged Microna S-80 B pigment, which is poorly retained in the fiber web at all filler levels.

Figure 11:
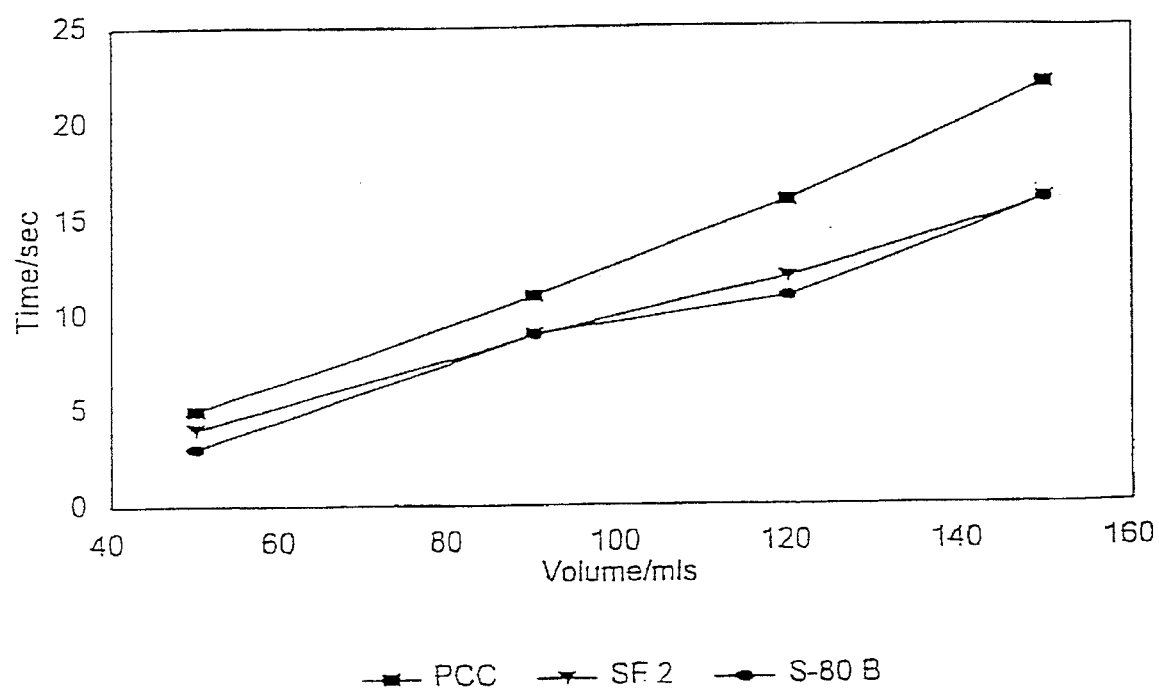
FIG. 11 is a graph of volume (mls) versus time (secs) that illustrates pulp vacuum assisted drainage results for Albacar LO, Microna S-80 B and SF 2.

Vacuum assisted drainage data at twenty percent filler addition are displayed in FIG. 11. FIG. 11 illustrates that SF 2 does not significantly retard the drainage of the fiber web relative to the well draining rhombohedral, low surface area pigment, Microna S-80 B. Albacar LO, which is a pigment with a scalenohedral morphology and significant internal porosity, retards drainage of the fiber web by up to forty percent relative to SF 2 and Microna S-80 B.

Figure 12:
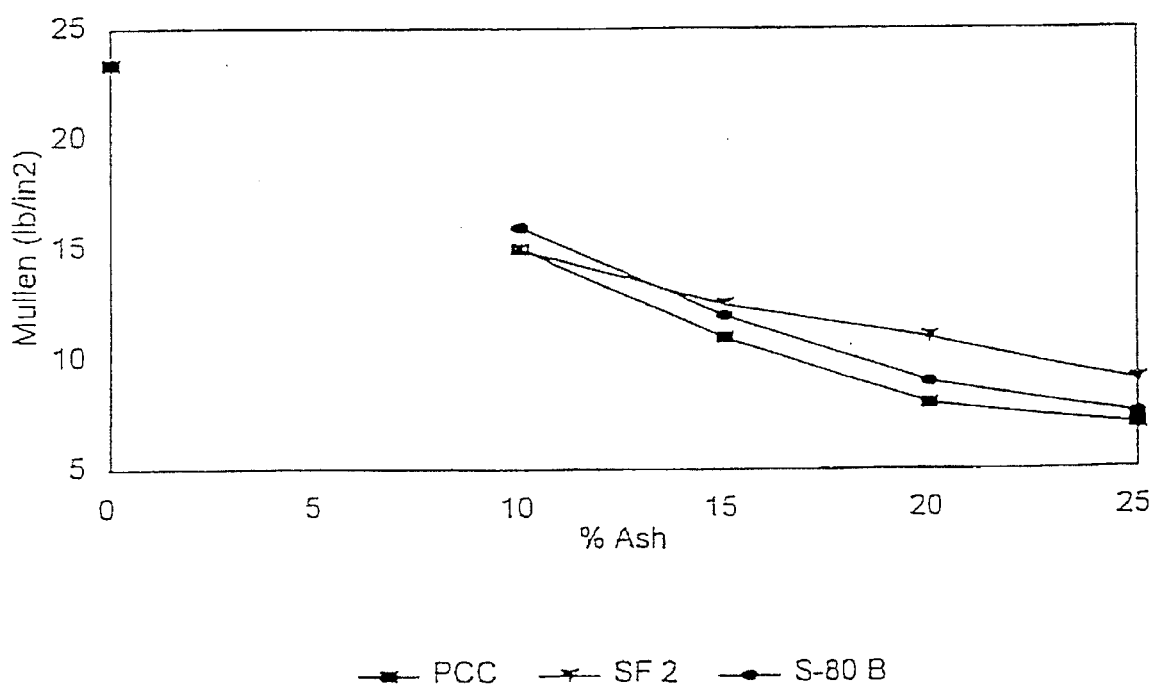
FIG. 12 is a graph of percent ash versus Mullen (lb/in$^2$) that illustrates the interpolated handsheet strength data (Mullen) as a function of Albacar LO, Microna S-80 B and SF 2 filler level.

Handsheet strength data are displayed in FIG. 12. FIG. 12 illustrates that the PCC filler Albacar LO impacts sheet strength more than would Microna S-80 B. SF 2 has the least impact on sheet strength.

Figure 13:
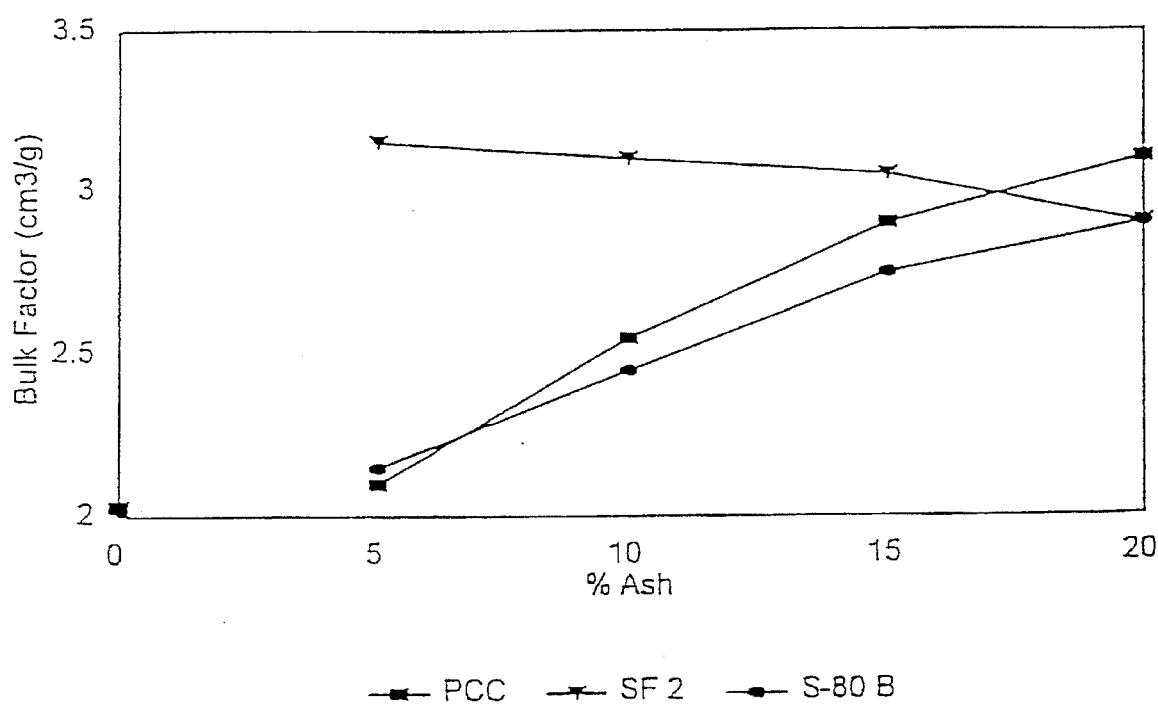
FIG. 13 is a graph of percent ash versus bulk factor (cm$^3$/g) that illustrates the interpolated handsheet bulk factors for Albacar LO, Microna S-80 B and SF 2 at various filler levels.

The impact of filler type on handsheet bulk factor is displayed in FIG. 13. FIG. 13 illustrates that the SF 2 gives significantly more bulk to the fiber web than would Microna S-80 B and Albacar LO. Sheet bulk is defined as (average caliper)/(average basis weight)×25.4 and is reported in $cm^3$/g.

Figure 14:
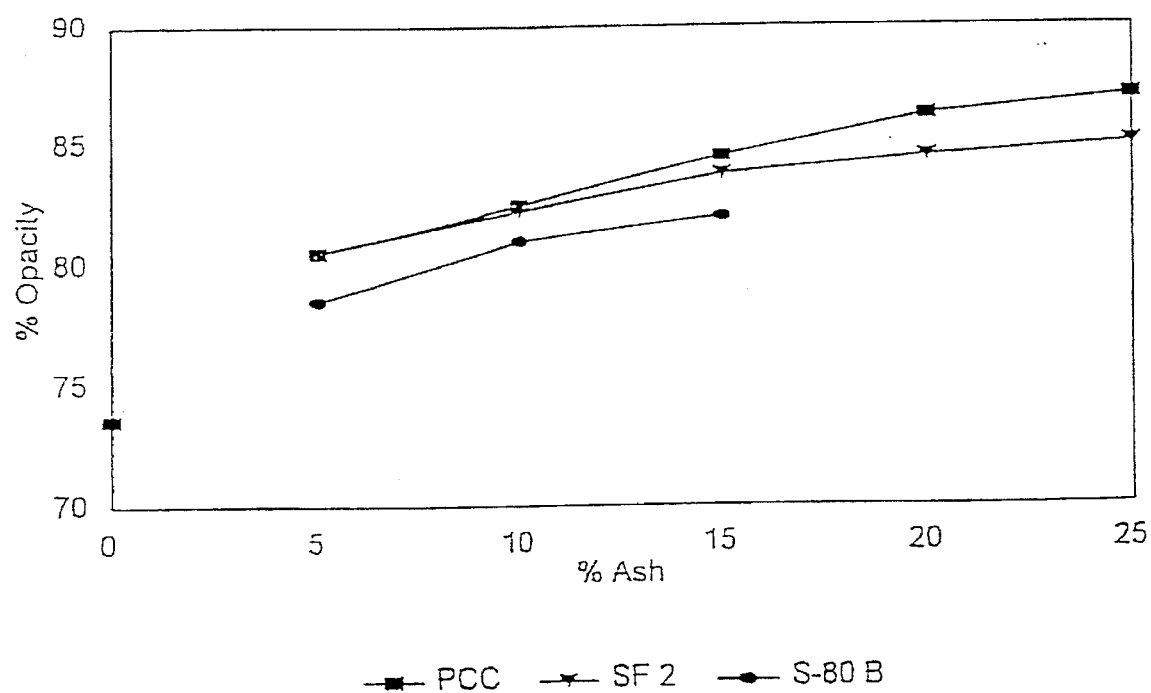
FIG. 14 is a graph of the percent ash versus percent opacity that illustrates the interpolated handsheet opacity results for Albacar LO, Microna 8-80 B and SF 2 at various filler levels.

Handsheet opacity data are displayed in FIG. 14. FIG. 14 shows that SF 2 significantly improves opacity relative to the untreated mineral filler, Microna S-80 B. SF 2 handsheet opacity data are within the errors of measurement, equivalent to those of Albacar LO at filler levels up to fifteen percent ash.

EXAMPLE 13

Mercury intrusion porosimetry analysis of Albacar LO, Albacar HO, SF 2 and SF 3 were carried out by Micromeritics, Norcross, Ga. The results are displayed in Table III below. Table III shows that the scalenohedral, synthetic, precipitated calcium carbonate pigments (Albacar LO and HO) have significantly higher internal pore volumes than the products of the present invention (SF 2 and SF 3).

TABLE III

| Mineral | Pore volume (ml/g) | Average Pore Diameter (microns) |
| --- | --- | --- |
| Albacar LO | 0.918 | 0.405 |
| Albacar HO | 1.361 | 0.337 |
| SF 2 | 0.255 | 0.081 |
| SF 3 | 0.270 | 0.085 |

Albacar HO is a higher opacifying pigment than Albacar LO. Example 12 shows that SF 2 has comparable light scattering ability to Albacar LO at filler levels up to fifteen percent ash, which would not be predicted from the pore volume data. The assemblage of fine and colloidal particles formed by practicing the present invention apparently produce a number of smaller interconnecting pores that also effectively scatter light.

The low total internal pore volume of the products of the present invention (when compared to Albacar LO and HO) support the good drainage and web strength results shown in Example 12 above.

EXAMPLE 14

Figure 15:
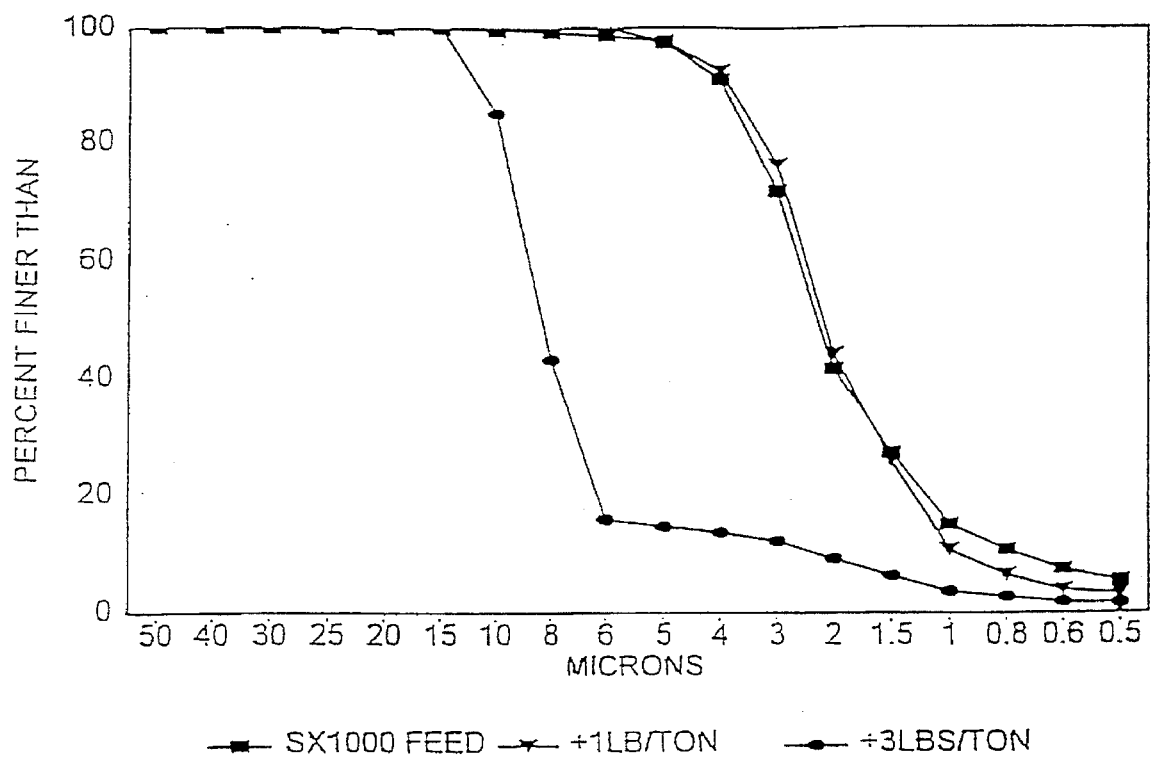
FIG. 15 is a graph of particle size in microns versus the percent of particles finer than the stated sizes that illustrates the effect of adding various quantities of the cationically charged polyelectrolyte AgeflocWT50 SLY to a ten percent solids suspension of the "clustered prismatic" precipitated calcium carbonate pigment, SX 1000.

A sample of SX 1000, which is a "clustered prismatic" synthetic precipitated calcium carbonate pigment, was diluted to ten percent solids in water. A one percent (weight/weight) aqueous solution of Agefloc WT50 SLV was added to the resulting SX 1000 slurry with stirring. The mean particle size of the feed precipitated calcium carbonate was about 2.3 microns. About seven percent by weight of the particles of the precipitated calcium carbonate were in the fine range. Adding three lbs/t of the cationic polyelectrolyte Agefloc WT50 SLV to the suspension produced an aggregated product with a mean particle size of 8.29 microns that contained no fine particles in suspension. The surface charge on the pigment changed from about −0.1 µeg/g (feed), to about +3 µeg/g after treatment. FIG. 15 shows the particle size curves for the feed and treated materials of this example.

EXAMPLE 15

Figure 16:
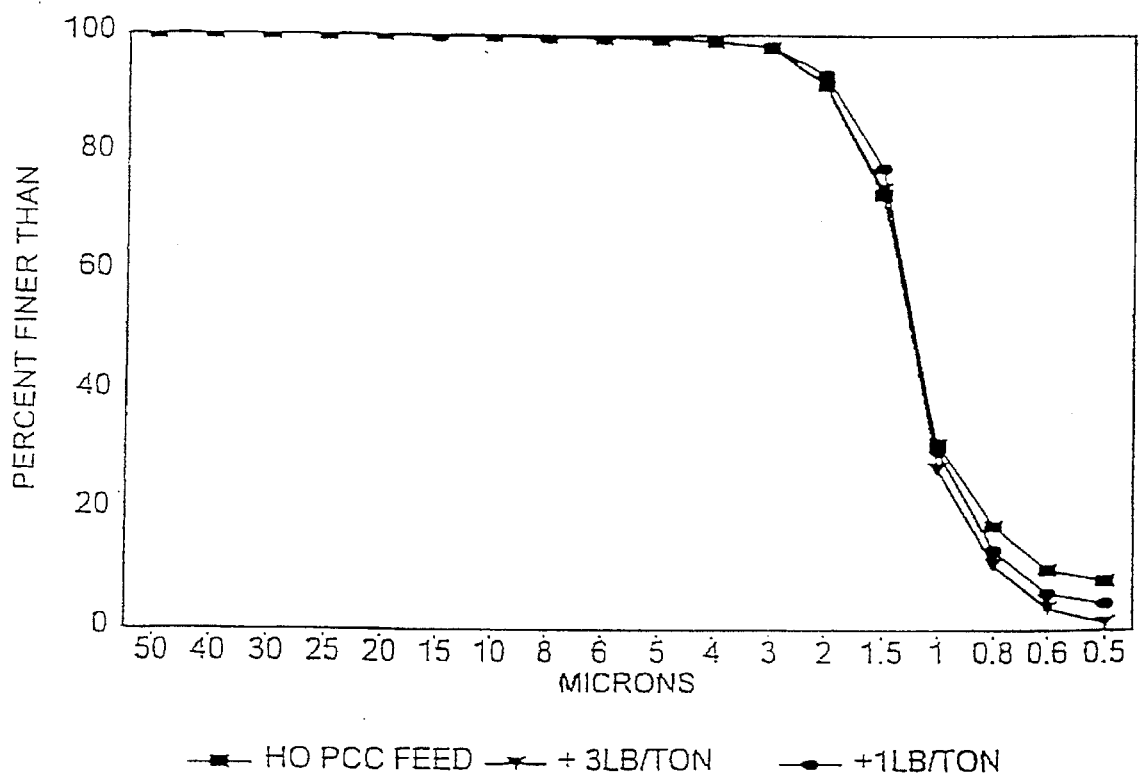
FIG. 16 is a graph of particle size in microns versus the percent of particles finer than the stated sizes that illustrates the effect of adding various quantities of the cationic polyelectrolyte Agefloc WT50 SLV to a ten percent solids suspension of the scalenohedral precipitated calcium carbonate pigment, Albacar HO.

A sample of Albacar HO, a scalenohedral morphology synthetic precipitated calcium carbonate pigment, was diluted to ten percent solids in water. One percent (weight/weight) aqueous solution of Agefloc WT50 SLV was added to the suspension with stirring. The mean particle size of the feed precipitated calcium carbonate was about 1.2 microns. Nine percent by weight of the particles in the feed suspension were in the fine range. A 3 lbs/t addition of the cationic polyelectrolyte Agefloc WT50 SLV produced an aggregated product having a mean particle size of about 1.2 microns. This suspension contained no fine particles in suspension. The surface charge on the filler changed from about −0.1 µeg/g (feed), to about +3.5 µeg/g after treatment. FIG. 16 shows the particle size curves for the feed and treated materials of this example.

EXAMPLE 16

Figure 17:
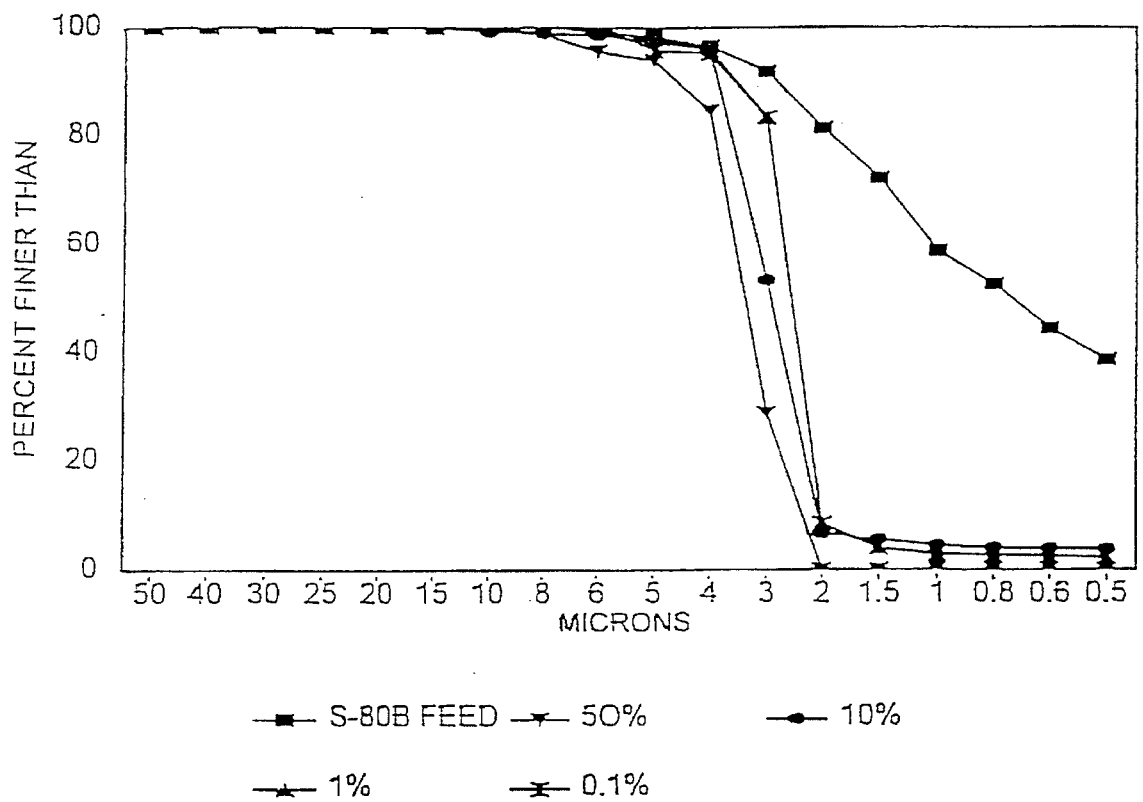
FIG. 17 is a graph of particle size in microns versus the percent of particles finer than the stated sizes that illustrates the effect of a five lbs/t addition of the cationic polyelectrolyte Agefloc WT50 SLV at different concentrations on the extent of aggregation of a Microna S-80 B feed mineral slurry.

A feed mineral suspension comprising Microna S-80 B at ten percent solids in water was obtained. 5 lbs/t of the cationic polyelectrolyte Agefloc WT50 SLV was added to the suspension. The concentration of the cationic polyelectrolyte was varied from 0.1 percent (weight/weight) in water to 50 percent (weight/weight) in the treatment experiments. FIG. 17 displays the results, which shows that the polymer concentration used to treat the feed mineral slurry has little or no impact on the extent of aggregation of the fines present in the feed mineral slurry.

EXAMPLE 17

Figure 18:
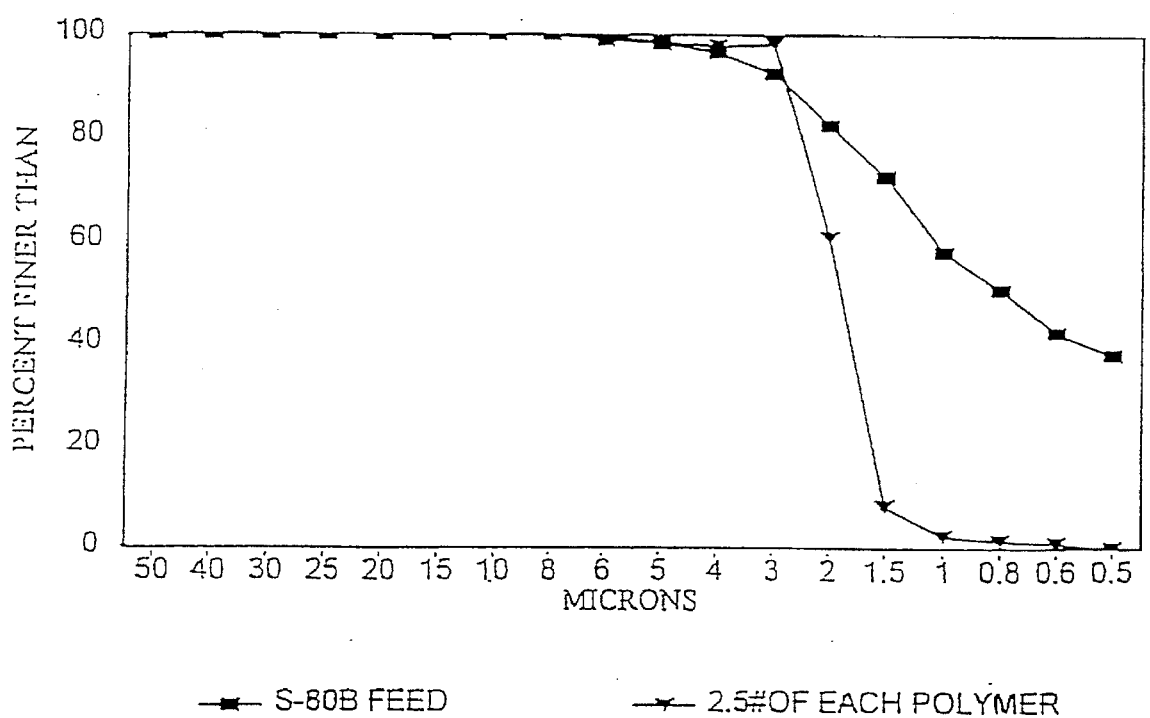
FIG. 18 is a graph of particle size in microns versus the percent of particles finer than the stated sizes that illustrates the effect of adding two different cationic polyelectrolytes on the aggregation of the fines present in Microna S-80 B.

A feed mineral suspension comprising Microna S-80 B at ten percent solids in water was obtained. 2.5 lbs/t of a one percent solution of the cationic polyelectrolyte Agefloc WT50 SLV and 2.5 lbs/t of a one percent solution of the cationic polyelectrolyte Agefloc B50 were added to the suspension with mixing. FIG. 18 displays the results from this experiment. Combinations of cationic polyelectrolytes can be effectively used to treat the feed mineral slurry, resulting in a product that contains no fine particles in suspension. The product of this example was indistinguishable from that of SF 2 as described in Example 8 above.

EXAMPLE 18

The paper web retention values of samples SF 3, SF 4 and SF 5, produced in Examples 9, 10 and 11, were compared to that of LO - PCC in order to determine if the surface charge of the aggregated product dominates retention. The same fiber blend and retention aid system was used as described in Example 12 above, with filler additions of ten, fifteen, twenty and twenty-five percent ash. Percent retention of a filler pigment in a paper web is defined as (final ash)/(applied ash)×one hundred percent.

SF 3 has a mean particle size of about 3.5 microns and a surface charge of about −7.7 µeg/g. SF 4 has a mean particle size of about 2.1 microns and a surface charge of about −3 µeg/g. SF 5 has a mean particle size of about 1.8 microns and a surface charge of about −20 µeg/g.

Figure 19:
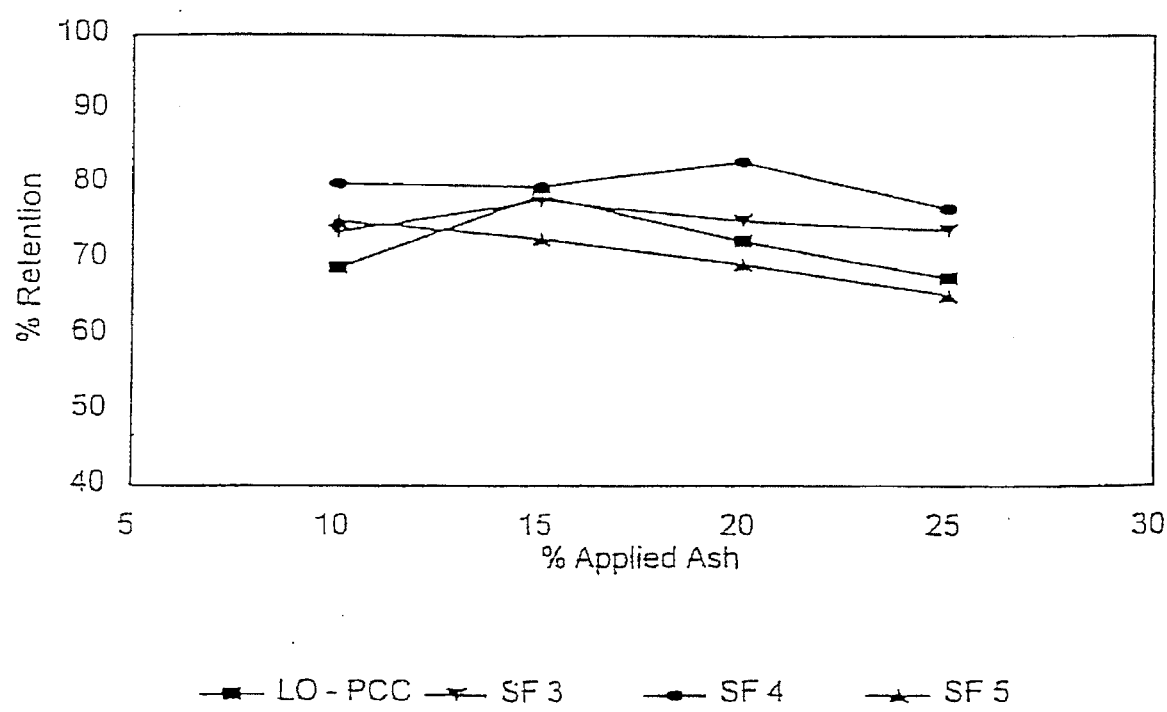
FIG. 19 is a graph of percent applied ash versus percent retention that illustrates the effect of aggregated pigment particle surface charge on paper web retention for the fillers SF 3, SF 4 and SF 5.

FIG. 19 displays the retention results from hand sheet study #2 which show that SF 3, SF 4 and SF 5 were retained as well, if not better than, the sample of LO - PCC. The PCC sample used in this example has a coarse, scalenohedral particle morphology, with a mean particle size of about 2.3 microns and a surface charge of about −0.1 µeg/g. Aggregation of the fine fraction of a given filler pigment improves its retention in a fiber web (see FIG. 10). Ash retention was high for all the products of this invention, irrespective of the surface charge of the aggregated filler particles.

EXAMPLE 19

Samples of Microna S-80 B, SF 2 and SF 3 were subjected to Einlehner AT 1000 abrasion testing. In this test the wear on a bronze wire developed by a ten percent mineral slurry is quantified as a weight loss factor. Typically, as mineral slurry particle size increases, the abrasion or weight loss of the bronze wire will increase. Mineral pigment abrasion is important to papermakers as more abrasive pigments will incur greater down time on a paper machine from changing worn out formation wires, and will wear slitting or conversion equipment used to turn rolls of paper into individual sheets.

The Einlehner abrasion results listed in Table IV below show that despite an increase in the mean particle size of the pigments SF 2 and SF 3 relative to the feed mineral slurry Microna S-80 B, no increase in bronze wire wear occurred. This would be expected because the intrinsic particle size distribution of the three products are all the same. The only difference is the polyelectrolyte treatment carried out to form SF 2 and SF 3. SF 2 and SF 3 are therefore not hard aggregated or fused products like calcined clays.

TABLE IV

| Product Name | Mean Particle Size | Einlehner Abrasion |
| --- | --- | --- |
| Microna S-80 B | 0.9 microns | 7.3 mg loss |
| Microna SF 2 | 1.86 microns | 6.8 mg loss |
| Microna SF 3 | 3.51 microns | 7.4 mg loss |

EXAMPLE 20

A sample of Microna S-80 B was diluted to a solids level of ten percent with water. To this feed mineral suspension was added, with stirring, a solution of one percent (weight/weight in water) of alum. Five, ten and twenty lbs/t alum to Microna S-80 B (wet solution on dry mineral) were used for the experiments.

Figure 20:
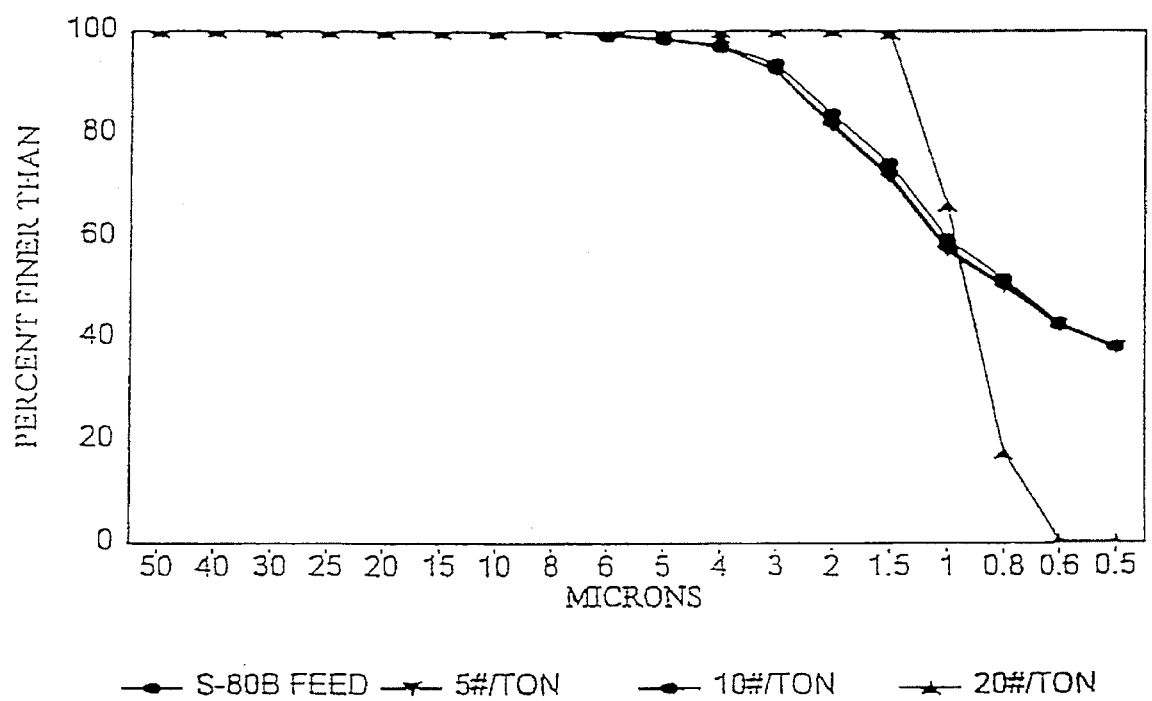
FIG. 20 is a graph of particle size in microns versus the percent of particles finer than the stated sizes that illustrates the effect of five, ten and twenty lbs/t additions of alum on the particle size curve of a ten percent solids suspension of Microna S-80 B.

The results illustrated in FIG. 20 show the impact of the addition of alum on the particle size curve of Microna S-80 B. At twenty lbs/t aggregation of the fines present in the feed mineral slurry occurs so that no fines are present in the sample after the treatment process. The particle surface charge changed from about −21 µeg/g for the feed mineral slurry Microna S-80 B to about +4.9 µeg/g for the aggregated product of this invention.

EXAMPLE 21

To further compare currently available paper filler mineral pigments, a series of laboratory handsheets were made (hand sheet study #3) using a blend of thirty percent hardwood, forty percent secondary fiber and thirty percent long fiber. The following polymer wet-end additives were sequentially added to the fiber blend with mixing; fifteen lbs/t of cationic potato starch, 1.5 lbs/t of ASA size and 0.4 lbs/t of an anionic retention aid. Final pulp consistency was about 0.3 percent. Varying amounts of the cationic filler pigment SF 1 and anionic filler pigment Microna S-80 B were added to the furnish with all of the additives present.

Figure 21:
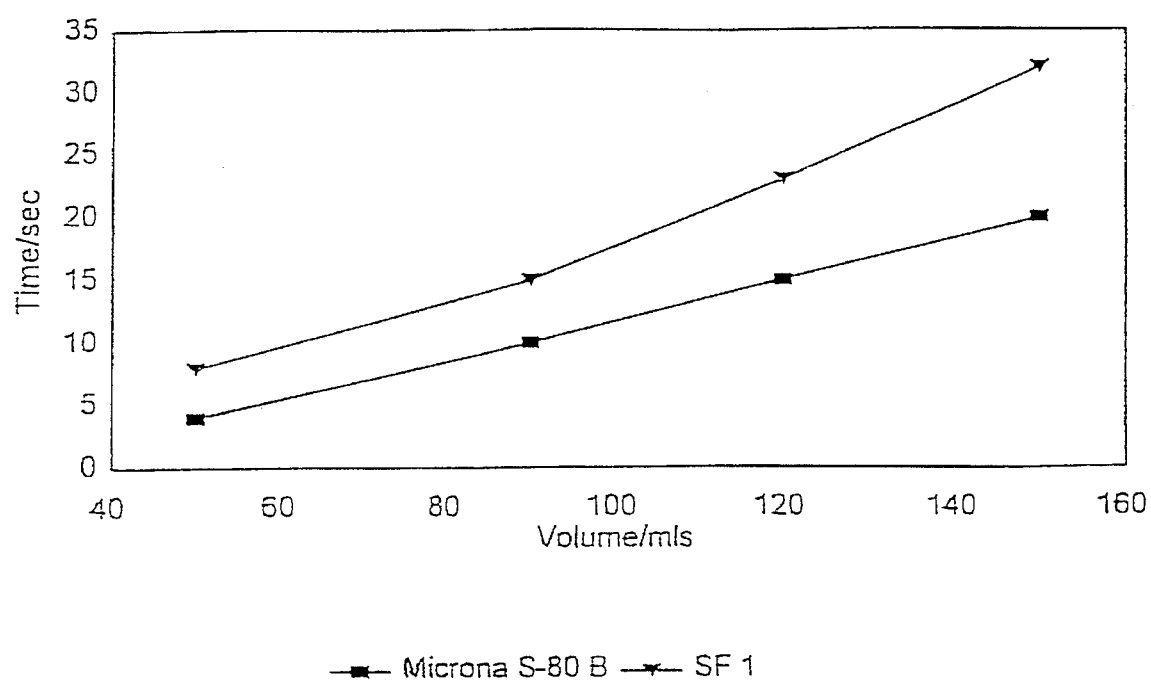
FIG. 21 is graph of volume (mls) versus time (secs) that illustrates the pulp vacuum assisted drainage results for Microna SF 1 and Microna S-80 B.

Vacuum assisted drainage data at twenty percent filler addition are displayed in FIG. 21. The cationic product SF 1 significantly retarded the drainage of the fiber web relative to the well draining rhombohedral, low surface area anionically dispersed pigment, Microna S-80 B. This is believed to be a result of the positive charge that SF 1 adds to the pulp, resulting in over flocculation of the fibers, and poor drainage.

Figure 22:
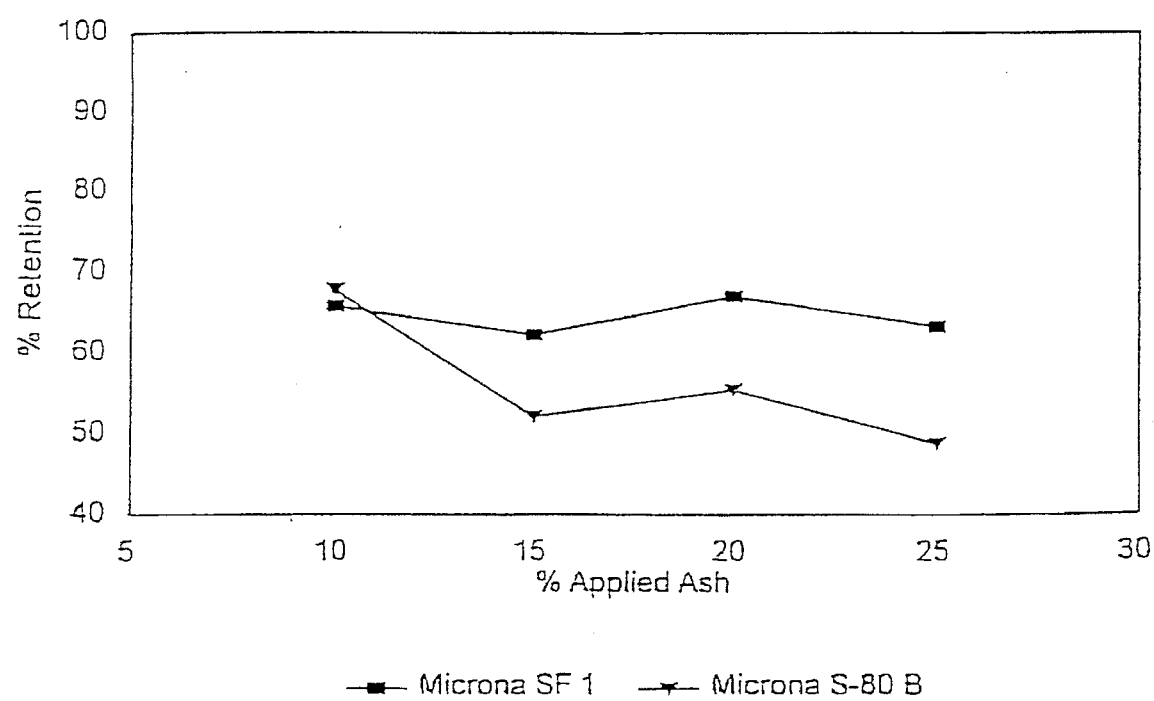
FIG. 22 is a graph of percent applied ash versus percent retention that illustrates the percent ash retention values for Microna SF 1 and Microna S-80 B as a function of applied ash.

FIG. 22 displays the relationship between the applied ash (added to the furnish) and the final ash in the paper web for these two filler pigments. Percent retention is defined as (final ash)/(applied ash)×one hundred percent. FIG. 22 illustrates that the cationic pigment SF 1 has retention characteristics better than Microna S-80 B but not as good as the coarse, bulky scalenohedral Albacar LO pigment (see FIG. 10) or the products of this invention shown in FIGS. 10 and 19.

EXAMPLE 22

A sample of Microna SF 1 was diluted to ten percent solids with water. A solution of one percent (weight/weight in water) of the anionic polyelectrolyte Acumer 9400, which has an estimated molecular weight of from about 1,000 to about 10,000, was added to the mineral suspension. Additions of one, three and five lbs/t Acumer 9400 to Microna SF 1 (wet polymer on dry mineral) were used in the treatment experiments.

Figure 23:
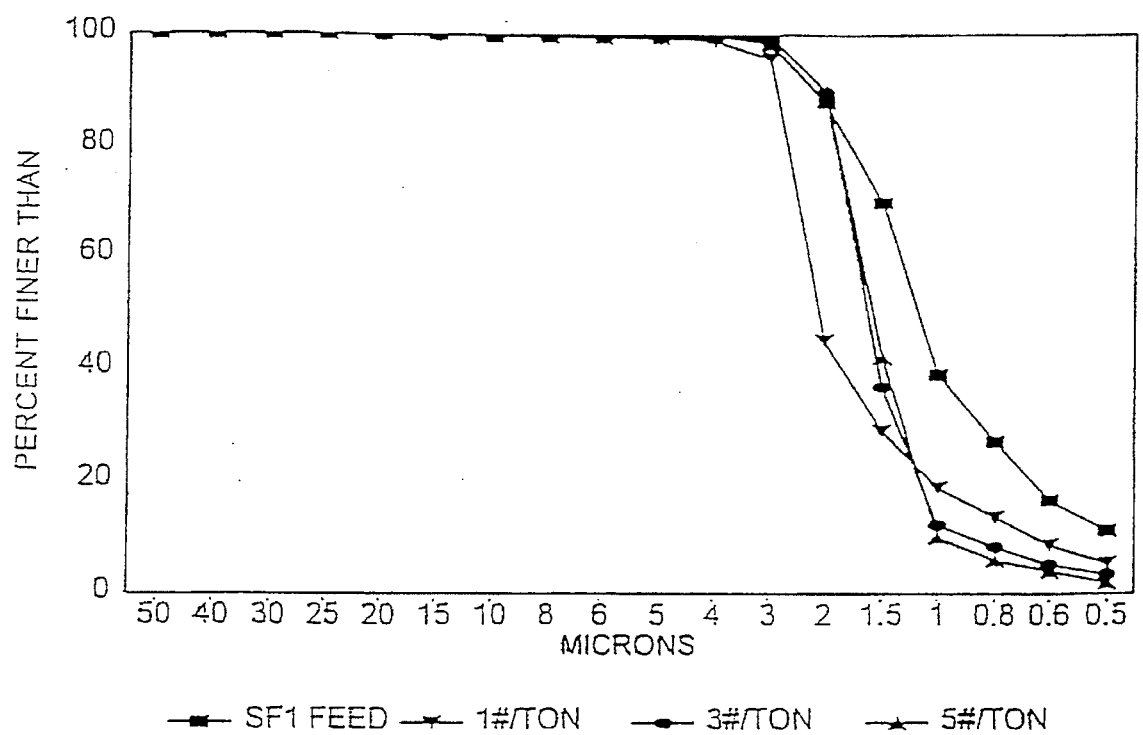
FIG. 23 is a graph of particle size in microns versus the percent of particles finer than the stated sizes that illustrates the effect of one, three and five lbs/t addition of the anionic polyelectrolyte, Acumer 9400, on the cationically dispersed mineral SF 1 at ten percent solids.

FIG. 23 shows the results from these experiments which demonstrate that the addition of a low-molecular-weight anionic polyelectrolyte to the cationically surface charged and dispersed mineral suspension results in selective aggregation of the fine component of the feed material when the treatment is carried out at low solids. The surface charge of the aggregated product was reduced from about +42 µeg/g to about +37 µeg/g after a one lb/t addition of the low-molecular-weight anionic polyelectrolyte, about +16 µeg/g after 3 lbs/t addition, and about +2.7 µeg/g after five lbs of the anionic polyelectrolyte were added to the feed material.

The present invention has been described in connection with preferred embodiments and multiple examples. It will be understood that the invention is not limited to those embodiments. On the contrary, the invention covers all alternatives, modifications, and equivalents as may be included within the spirit and scope of the invention as defined by the following claims.

I claim:

1. A method for producing fillers for cellulosic products, comprising:

providing an ionically dispersed aqueous slurry comprising from about 1 percent to about 30 percent solid mineral particles by weight, the slurry containing fine particles and having a bulk charge; and adding at least about 5 pounds of a low-molecular-weight aggregating agent per ton of mineral particle, to the dispersed aqueous slurry to selectively aggregate fine and ultra-fine particles present in the dispersed slurry, the aggregating agent having a charge opposite to the bulk charge of the slurry.

2. The method of claim 1 wherein the mineral particles are selected from the group consisting of calcium carbonate, calcium hydroxide, magnesium carbonate, magnesium hydroxide, aluminum hydroxide, calcium sulfate and mixtures thereof.

3. The method of claim 1 wherein the mineral particles comprise ground natural calcium carbonate or synthetically precipitated calcium carbonate.

4. The method of claim 1 wherein the dispersed slurry has from about 1 percent to about 15 percent solids by weight.

5. The method of claim 1 wherein the dispersed slurry has from about 1 to about 10 percent solids by weight.

6. The method of claim 1 wherein the dispersed slurry of mineral particles is ionically dispersed with a compound selected from the group consisting of a polyacrylic acid homopolymer; polyacrylic acid copolymer; polymethacrylic acid; polycarboxylic acid containing vinyl monomers; polysulfonic acid containing vinyl monomers; poly (alkyl diallyl quaternary ammonium) salts; quaternary ammonium cationic polymers obtained by copolymerizing aliphatic secondary amines with epichlorohydrin; poly (quaternary ammonium) polyether salts that contain quaternary nitrogen in a polymeric backbone chain extended by ether groups; polyamines; copolymers of acrylamide with cationic vinyl monomers; poly (dimethyldiallylammonium) chloride; low-molecular-weight polyethyleneimine polyelectrolytes; and mixtures thereof.

7. The method of claim 1 wherein the mineral particles are dispersed with an anionic dispersant.

8. The method of claim 7 wherein the anionic dispersant is selected from the group consisting of polycarboxylic acid containing vinyl monomers, polysulfonic acid containing vinyl monomers, and mixtures thereof.

9. The method of claim 7 wherein the anionic dispersant is selected from the group consisting of polyacrylic acid homopolymers, polyacrylic acid copolymers, polymethacrylic acid, and mixtures thereof.

10. The method of claim 7 wherein the anionic dispersant comprises polyacrylic acid.

11. The method of claim 1 wherein the dispersed slurry of mineral particles is dispersed with a cationic dispersant.

12. The method of claim 11 wherein the cationic dispersant is selected from the group consisting of poly (alkyl diallyl quaternary ammonium) salts; quaternary ammonium cationic polymers obtained by copolymerizing aliphatic secondary amines with epichlorohydrin; poly (quaternary ammonium) polyether salts that contain quaternary nitrogen in a polymeric backbone chain extended by ether groups; polyamines; copolymers of acrylamide with cationic vinyl monomers; dimethyldiallylammonium chloride; low-molecular-weight polyethyleneimine polyelectrolytes; and mixtures thereof.

13. The method of claim 11 wherein the cationic dispersant comprises dimethylamine epichlorohydrin copolymer.

14. The method of claim 1 wherein the low-molecular-weight aggregating agent is selected from the group consisting of poly (alkyl diallyl quaternary ammonium) salts; quaternary ammonium cationic polymers obtained by copolymerizing aliphatic secondary amines with epichlorohydrin; poly (quaternary ammonium) polyether salts that contain quaternary nitrogen in a polymeric backbone chain extended by ether groups; polyamines; copolymers of acrylamide with cationic vinyl monomers; dimethylamine epichlorohydrin copolymers; dimethyldiallylammonium chloride homopolymer; dimethyldiallylammonium chloride copolymer; divalent metal ion salts; trivalent metal ion salts; polyethyleneimine polyelectrolytes; polyacrylic acid homopolymer; polyacrylic acid water-soluble salts; carboxyl containing polymers derived from methacrylic acid, itaconic acid and crotonic acid; and mixtures thereof.

15. The method of claim 1 wherein the low-molecular-weight aggregating agent comprises dimethyldiallylammonium chloride homopolymer.

16. The method of claim 1 wherein the low-molecular-weight aggregating agent comprises polyacrylic acid homopolymer.

17. The method of claim 14 wherein the divalent metal ion salt is selected from the group of salts consisting of calcium, magnesium, nickel, manganese, copper, zinc and tin salts, and mixtures thereof.

18. The method of claim 14 wherein the divalent metal ion salt is selected from the group of salts consisting of magnesium chloride, calcium chloride, magnesium hydroxide, calcium hydroxide, magnesium nitrate, calcium nitrate, and mixtures thereof.

19. The method of claim 14 wherein the trivalent metal ion salt is selected from the group of salts consisting of aluminum, iron, chromium and titanium salts, and mixtures thereof.

20. The method of claim 14 wherein the trivalent metal ion salt is selected from the group consisting of aluminum sulphate, polyaluminum chloride, sodium aluminate, and mixtures thereof.

21. The method of claim 1 wherein the aggregating agent is added to the ionically dispersed aqueous slurry of mineral particles in an amount of at least about 5 pounds aggregating agent per ton of mineral particles.

22. The method of claim 1 wherein the low-molecular-weight aggregating agent has a molecular weight of from about 10,000 to about 20,000.

23. A method for producing filler for filling paper and paper board, comprising providing an aqueous slurry comprising from about 1 percent to about 30 percent solids by weight of mineral particles, the mineral particles being selected from the group consisting of calcium carbonate, calcium hydroxide, magnesium carbonate, magnesium hydroxide, aluminum hydroxide, calcium sulfate and mixtures thereof;

providing a dispersing agent in the slurry to disperse the mineral particles, thereby producing a dispersed aqueous suspension of mineral particles, the dispersed aqueous suspension having a bulk charge; and adding a low-molecular-weight aggregating agent to the dispersed aqueous slurry in an amount of at least about 5 pounds aggregating agent per ton of mineral particles to selectively aggregate the fine and ultra-fine particles present in the dispersed aqueous slurry, the aggregating agent having a charge opposite in sign to the bulk charge of the slurry.

24. The method of claim 23 wherein the dispersed aqueous suspension comprises from about 1 percent to about 10 percent solids by weight.

25. The method of claim 23 wherein the dispersing agent is an anionic dispersant.

26. The method of claim 25 wherein the dispersing agent comprises polyacrylic acid.

27. The method of claim 23 wherein the dispersing agent is a cationic dispersant.

28. The method of claim 27 wherein the cationic dispersant comprises dimethylamine epichlorohydrin copolymer.

29. A method for producing fillers for paper and paper board, comprising:

providing a dispersed aqueous slurry comprising from about 1 percent by weight to about 15 percent by weight ground natural calcium carbonate, synthetically precipitated calcium carbonate or mixtures thereof; and adding at least about 5 lbs of an aggregating agent per ton of calcium carbonate to the dispersed aqueous slurry to selectively aggregate fine and ultra-fine particles present in the dispersed aqueous slurry, the aggregating agent being selected from the group consisting of poly (alkyl diallyl quaternary ammonium) salts; quaternary ammonium cationic polymers obtained by copolymerizing aliphatic secondary amines with epichlorohydrin; poly (quaternary ammonium) polyether salts that contain quaternary nitrogen in a polymeric backbone chain extended by ether groups; polyamines; copolymers of acrylamide with cationic vinyl monomers; dimethylamine epichlorohydrin copolymers; dimethyldiallylammonium chloride homopolymer; dimethyldiallylammonium chloride copolymer; divalent metal ion salts; trivalent metal ion salts; polyethyleneimine polyelectrolytes; polyacrylic acid homopolymer; polyacrylic acid water-soluble salts; carboxyl containing polymers derived from methacrylic acid, itaconic acid and crotonic acid; and mixtures thereof.

30. The method of claim 29 wherein the step of providing a dispersed aqueous slurry comprises adding a dispersing agent to a suspension of ground natural calcium carbonate, synthetically precipitated calcium carbonate, or mixtures thereof.

31. The method according to claim 29 wherein the dispersed aqueous slurry comprises from about 1 percent to about 10 percent ground natural calcium carbonate or synthetically precipitated calcium carbonate.

32. The method of claim 29 wherein the low-molecular-weight aggregating agent comprises dimethyldiallylammonium chloride homopolymer.

33. A method for producing fillers for paper and paper board, comprising:

providing a dispersed aqueous slurry comprising from about 1 percent to about 10 percent ground natural calcium carbonate or synthetically precipitated calcium carbonate; and adding at least about 5 lbs of dimethyldiallylammonium chloride homopolymer per ton of calcium carbonate to the dispersed aqueous slurry to selectively aggregate fine and ultra-fine particles present in the dispersed aqueous slurry.

34. A filler for paper or paper board, the filler being produced according to the process of claim 1.

35. A filler for paper or paper board, the filler being produced according to the process of claim 23.

36. An aqueous filler suspension for filling paper or paper board, the suspension comprising:

water; and from about 1 percent to about 15 percent solid mineral particles by weight, the mineral particles comprising both fine and coarse particles that are composed of a material selected from the group consisting of ground natural calcium carbonate, synthetically precipitated calcium carbonate, calcium hydroxide, magnesium carbonate, magnesium hydroxide, aluminum hydroxide, calcium sulfate and mixtures thereof, wherein at least a portion of the fine particles are contained in aggregate particles that have an equivalent spherical diameter of at least 0.5 microns and wherein particles having diameters of less than 0.5 microns comprise less than about 30% of the total weight of all particles in the suspension.

37. An aqueous filler suspension for filling paper or paper board, the suspension comprising:

water and from about 1 percent to about 15 percent solid mineral particles by weight selected from the group consisting of ground natural calcium carbonate, synthetically precipitated calcium carbonate and mixtures thereof and, wherein the mineral particles have been selectively aggregated.

* * * * *

UNITED STATES PATENT AND TRADEMARK OFFICE
CERTIFICATE OF CORRECTION

PATENT NO. : 5,653,795
DATED : August 5, 1997
INVENTOR(S) : Alan J. Brown

It is certified that error appears in the above-identified patent and that said Letters Patent is hereby corrected as shown below:

Column 4, line 40, "salts Consisting" should be --salts consisting--;

Column 4, line 50, "byway" should be --by way--;

Column 6, line 52, "8-80B" should be --S-80B--;

Column 6, line 58, "SLY" should be --SLV--;

Column 7, line 5, "iS" should be --is--;

Column 8, line 16, "Wherein" should be --wherein--;

Column 9, line 22, "acrylic copolymers" should be --acrylic acid copolymers--;

Column 10, line 22, "20,000. and" should be --20,000, and--;

UNITED STATES PATENT AND TRADEMARK OFFICE
CERTIFICATE OF CORRECTION

PATENT NO.  : 5,653,795
DATED       : August 5, 1997
INVENTOR(S) : Alan J. Brown It is certified that error appears in the above-identified patent and that said Letters Patent is hereby corrected as shown below:

Column 13, line 36, "AS0 LV" should be --A50 LV--;

Column 13, line 42, "POD' should be --PCD--;

In the Claims:

Column 22, line 42, "comprising" should be --comprising:--;

Column 24, line 40, "thereof and, wherein" should be --thereof, wherein--.

Signed and Sealed this

Second Day of February, 1999

Attest:

Attesting Officer

*Acting Commissioner of Patents and Trademarks*